United States Patent [19]
Kato

[11] Patent Number: 6,055,334
[45] Date of Patent: *Apr. 25, 2000

[54] IMAGE PROCESSING DEVICE AND METHOD FOR DETECTING THE LOCATION OF THE FEATURE OF INTEREST IN AN OBJECT IMAGE

[75] Inventor: Takayuki Kato, Kyoto-Fu, Japan

[73] Assignee: Omron Corporation, Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/507,011

[22] Filed: Jul. 25, 1995

[30] Foreign Application Priority Data

Jul. 25, 1994 [JP] Japan ................................ 6-192259

[51] Int. Cl.$^7$ .............. G06K 9/00; G06K 9/46; G06K 9/66

[52] U.S. Cl. .............. 382/190; 382/103; 382/192; 382/194; 382/201

[58] Field of Search .............. 382/190, 192, 382/194, 201, 205, 197, 103; 395/142, 216, 289, 294, 119

[56] References Cited

U.S. PATENT DOCUMENTS

| | | | |
|---|---|---|---|
| 4,326,190 | 4/1982 | Borland et al. | 382/197 |
| 4,493,105 | 1/1985 | Beall et al. | 382/203 |
| 5,333,248 | 7/1994 | Christensen | 395/119 |
| 5,555,555 | 9/1996 | Sato et al. | 382/104 |

*Primary Examiner*—Leo H. Boudreau
*Assistant Examiner*—Daniel G. Mariam
*Attorney, Agent, or Firm*—Dickstein, Shapiro, Morin & Oshinsky

[57] ABSTRACT

An image and method for determining the location of known pattern of data in a captured object image wherein a feature analysis is performed upon a representative plurality of pixel locations to determine a starting point, feature analysis is performed upon the pixel locations surrounding the starting point and the starting point is moved to another pixel location if provides a higher feature analysis value than the starting point; the process of performing feature analyses and moving the starting point continues until the starting point is moved a maximum feature analysis value; once the maximum feature analysis value is found, the object image data may be rotated incrementally with respect to the reference pattern data and the feature analysis/starting point selection process repeated for each iteration until an object image location and object angle of rotation is determined.

11 Claims, 19 Drawing Sheets

FIG. 10

| $S_{11}$ | $S_{12}$ | $S_{13}$ |
|---|---|---|
| $S_{21}$ | $S_{22}$ | $S_{23}$ |
| $S_{31}$ | $S_{32}$ | $S_{33}$ |

FIG. 12

| 2 | 3 | 4 |
|---|---|---|
| 5 | 1 | 6 |
| 7 | 8 | 9 |

FIG. 14

| 1 | 2 | 3 |
|---|---|---|
| 8 |   | 4 |
| 7 | 6 | 5 |

IMAGE PROCESSING DEVICE AND METHOD FOR DETECTING THE LOCATION OF THE FEATURE OF INTEREST IN AN OBJECT IMAGE

FIELD OF THE INVENTION

This invention concerns an image processing device. More specifically, it concerns an image processing device and method which are ideally suited for matching the object pattern with a previously stored reference pattern, and detecting where a reference pattern is found in an object image to be detected.

BACKGROUND OF THE INVENTION

In the prior art, the following image processing device and method is used to detect the location of the feature of interest in the object image.

As a first step, reference pattern data representing a reference pattern are obtained by imaging a reference model and recording it. Then, object image data representing an object image are obtained by imaging an object image by scanning, pixel by pixel, using a window large enough to contain the reference pattern. At each location of the window, a coincidence calculation is made to determine the degree of coincidence between the reference pattern data and the object image data. A location of the window where the object image data shows the highest coincidence with the reference pattern data is chosen as the location of the feature of interest in the object image.

Since the prior art image location detecting device must calculate the degree of coincidence between the reference pattern data and the object image data while scanning pixel by pixel, a large number of calculations are required at each scanning position, with the result that it is impossible to determine the location of the feature of interest at high speed.

Also, because it is calculated in pixels, the location of the feature of interest cannot be determined more precisely than in units corresponding to the size of a pixel.

SUMMARY OF THE INVENTION

The objective of this invention is to provide an image processing device and method which would be able to determine, quickly and precisely, the location of a feature on an object image which is of interest for the purpose of pattern matching or detecting location.

The image processing device according to the first embodiment of this invention is equipped with: 1) an image device which captures an image of reference pattern and object image and outputs data which represent the images; 2) an image memory in which are stored the data from the imaging device; 3) a starting point searching means which performs a feature analysis at a number of representative pixel locations in a object image data stored in the image memory and determines the location with the extreme coincident value to be the starting point of a search; 4) a feature-counting means which takes the starting point as the center point and performs a feature analysis at every pixel location in the search zone around the center point; and 5) a first control device which finds the specific pixel location in the search zone with the highest value as determined by the feature analysis, and, if this location is the starting point, determines that this will be the location of the feature of interest. If the location with the highest feature analysis value is not the starting point, the control device takes this location as the center point of a new search zone, and causes the feature-counting device to perform a feature analysis at every pixel location in the new search zone. Taking in each instance the center point as the location with the highest feature analysis value, the control device continues performing feature analyses and detecting the highest value until the current location with the highest feature analysis value is identical to the previous location with the highest feature analysis value. The image processing device then takes this location as the location of the feature of interest.

The image processing method of this invention comprises the steps of:

(a) gathering image data which represents an object image;

(b) storing the image data in an image memory;

(c) performing a feature analysis at a number of representative pixel locations in the data stored in the image memory, and choosing the location with the highest feature analysis value as a starting point of a search;

(d) performing a feature analysis at every pixel location in the search zone using the starting point as a center point, and finding the pixel location in a search zone with the highest feature analysis value;

(e) if the location with the highest feature analysis value is the aforesaid starting point, it is chosen as the location of the feature of interest; and (f) if the location with the highest feature analysis value is not the starting point, choosing this location as the starting point of a new search zone, and repeating steps (d) and (e) until the current location with the highest feature analysis value is identical to the previous location with the highest feature analysis value; and choosing this location as the location of the feature of interest.

With this invention, the image of an object is captured and data representing this image are stored in an image memory. A feature analysis is made at a number of representative pixel locations in the image data stored in the memory. The feature analysis may be defined by such functions as a normalized correlation, the degree of resemblance according to a fuzzy inference, or a technique using the distance between image data. The pixel locations with extreme values (maximum and minimum values) according to the feature analysis are chosen as the starting points for a search.

When the starting point for the search is chosen, a search zone is established with that point as the center. A feature analysis is made at every pixel location in that zone. The search zone is a square or circular area with the starting point at its center. The feature analysis allows us to find the pixel location in the search zone which has an extreme value. If the location that has the extreme value is the center point of the search zone, that location is chosen as the location of the feature of interest. If the location with the extreme analysis value is not the center point of the search zone, a new search zone is established centered around the pixel location that has the extreme value. A feature analysis is made at every pixel location in the new search zone, and the location with the extreme value is found. The feature analysis is repeated and the location with the extreme value is found again each time a new center point is chosen for the search zone until the pixel location with the extreme value is located in the center of the search zone. This pixel location is chosen as the location of the feature of interest. This feature site is the location where a pattern similar or identical to the reference pattern is likely to be found (or not found) in pattern matching or position location, and it is used as a basis for those processes.

Once feature analyses are made in representative pixel locations and the locations with extreme values are found, these locations are used as starting points for searches which uncover more locations with extreme values. This method requires calculation cycles to be repeated substantially shorter times than methods which perform a feature analysis at every pixel location in the object image data. This allows pattern matching or location measurement to be executed more rapidly.

The image processing device or method according to the second embodiment of this invention can be used in such a way that the object image and the reference pattern are rotated relative to each other (i.e., their angular position is changed). In this way the device can be developed as needed for various applications.

The image processing device modified in this way can be realized by adding a second control device to the image processing device described earlier. This second control device rotates over a given angle either the image represented by the image data in the image memory or the reference pattern against which this image is to be checked. As this angle of rotation is changed, the first control device repeatedly performs location measurement to determine a feature site after each rotation. Based on the feature analysis for the location chosen after each rotation and on the angle of rotation, an object angle of rotation is calculated which represents a relative angle of rotation between the object image and the reference pattern. A feature site is output at the object angle of rotation which has been calculated.

The image processing method according to this embodiment of the invention comprises:

(a) gathering data which represents an object image;

(b) storing the image data in an image memory;

(c) performing a feature analysis at a number of representative pixel locations in the data stored in the image memory, and choosing the location with the highest feature analysis value as the starting point of a search;

(d) performing a feature analysis at every pixel location in a search zone using the starting point as a center point, and finding the pixel location in the search zone with the highest feature analysis value;

(e) If this location is the starting point, choosing it as the location of the feature of interest;

(f) If the location with the highest feature analysis value is not the starting point, choosing this location as the center point of a new search zone, and repeating steps (d) and (e) until the current location with the highest feature analysis value is identical to the previous location with the highest feature analysis value; and choosing this location as the location of the feature of interest;

(g) rotating either the image represented in the data stored in the image memory or the reference pattern against which it is being checked over a given angle; and repeating steps (c) through (f) after each rotation, and each time a new feature site is chosen; and (h) calculating the object angle of rotation at which the image most nearly matches the reference pattern based on the feature analysis at each site chosen after rotation and the angle of rotation, and outputting a feature site for the object angle of rotation which has been calculated.

The object angle of rotation is calculated by means of parabolic approximation, based on the highest feature analysis value at the feature site produced by each rotation and the feature analyses in the area surrounding this site and on their angles of rotation.

According to this embodiment of this invention, either the object image expressed as image data or the reference pattern is rotated over a varying angle of rotation, and a feature site is determined after each rotation. The object angle of rotation is calculated based on the feature analysis at each feature site chosen after rotation and on the previous angle of rotation. The feature site chosen at this object angle of rotation is output.

Thus even if the image has been rotated, the object angle of rotation and the location of the feature of interest can be obtained rapidly and accurately.

In a situation in which this invention is actually implemented, the aforesaid feature analysis value would result in a value expressing the degree of coincidence between previously recorded data representing a reference pattern and the object image data representing the object. Functions which could be evaluated to express the goodness of the match include the conformity value, the similarity coefficient, and the index of coincidence.

In the example of implementation which we are discussing, the value which expresses the aforesaid degree of coincidence is a normalized correlation between previously recorded data representing a reference pattern and the object image data representing the object image.

There may be more than one location in the search zone where the feature analysis value is extreme.

If there is more than one location with an extreme value and the center point of the search is one of these locations, the sum will be taken of all the feature analysis values obtained at pixel locations in each search zone projected around a location with an extreme value, and the type I (first) location having the highest sum will be found. If the type I location with the highest sum is the center point of the original search zone, it is chosen as the location of the feature of interest. If it is not, it is taken as the center point of the next search zone.

If there is more than one location with an extreme value and the center point of the search is not one of these locations, the sum will be taken of all the feature analysis values obtained at the pixel locations contiguous to the location with the extreme value in each search zone, and the type II (second) location with the highest sum will become the center point of the next search zone.

Thus the location of the feature of interest or the center point for the next search zone can be determined even though there is more than one location in the search zone with an extreme feature analysis value.

It is also possible for there to be more than one location determined to have the highest sum of feature analysis values of either the first or the second type described above.

In such a case, the type I location with the highest sum will be determined according to a previously established priority rating.

The type II location with the highest sum will also be determined according to a previously established priority rating.

This makes it possible to determine a feature site or a center point for a search zone even when there is more than one location given a maximum feature analysis value by either type of summing operation.

Another embodiment according to this invention will have a device which calculates, in units smaller than pixels, the location of the final feature site. This calculation is based on the feature analysis values at the feature sites output by the first or second control device, and on the feature analyses for the pixel locations surrounding the feature sites, and on the locations of these feature sites and neighboring pixels.

The location of the final feature site is calculated on the basis of the feature sites and the two neighboring pixel locations to their right and left and the feature analyses in those locations, and the feature sites and the two neighboring pixel locations above and below them and the feature analyses in those locations. Using parabolic approximation, the locations are calculated along both the horizontal and the vertical lines which have the highest feature analysis values.

The final location of the feature of interest can also be calculated by determining the barycenter.

In this ideal embodiment, the location of the feature of interest on the object is calculated in units smaller than pixels. This allows a location on the object to be measured very precisely.

BRIEF DESCRIPTION OF THE INVENTION

FIG. 10 illustrates how the square is set up.

FIG. 11 shows how a new square is established when there are two locations with a maximum value, and the center of the square is one of these locations. (A) illustrates the situation in which one of the two locations with a maximum value is the center of the square. (B) shows one of the squares created around a location with a maximum value. (C) shows the square created around the other location with a maximum value. (D) shows the newly updated square.

FIG. 12 shows the priority method for determining which location will be considered to have the maximum value when the center of the square is one of the locations with a maximum value and two or more of these locations have identical sums.

FIG. 13 shows how a new square is established when there is more than one location with a maximum value, and the center of the square is not one of these locations. (A) shows a situation in which there are two locations with maximum values, neither of which is in the center of the square. (B) shows one of the squares created around a location with a maximum value. (C) shows the square created around the other location with a maximum value. (D) shows a newly updated square.

FIG. 14 shows the priority method for determining which location will be considered to have the maximum value when the center of the square is not one of the locations with a maximum value and two or more of these locations have identical sums.

Figure 15:
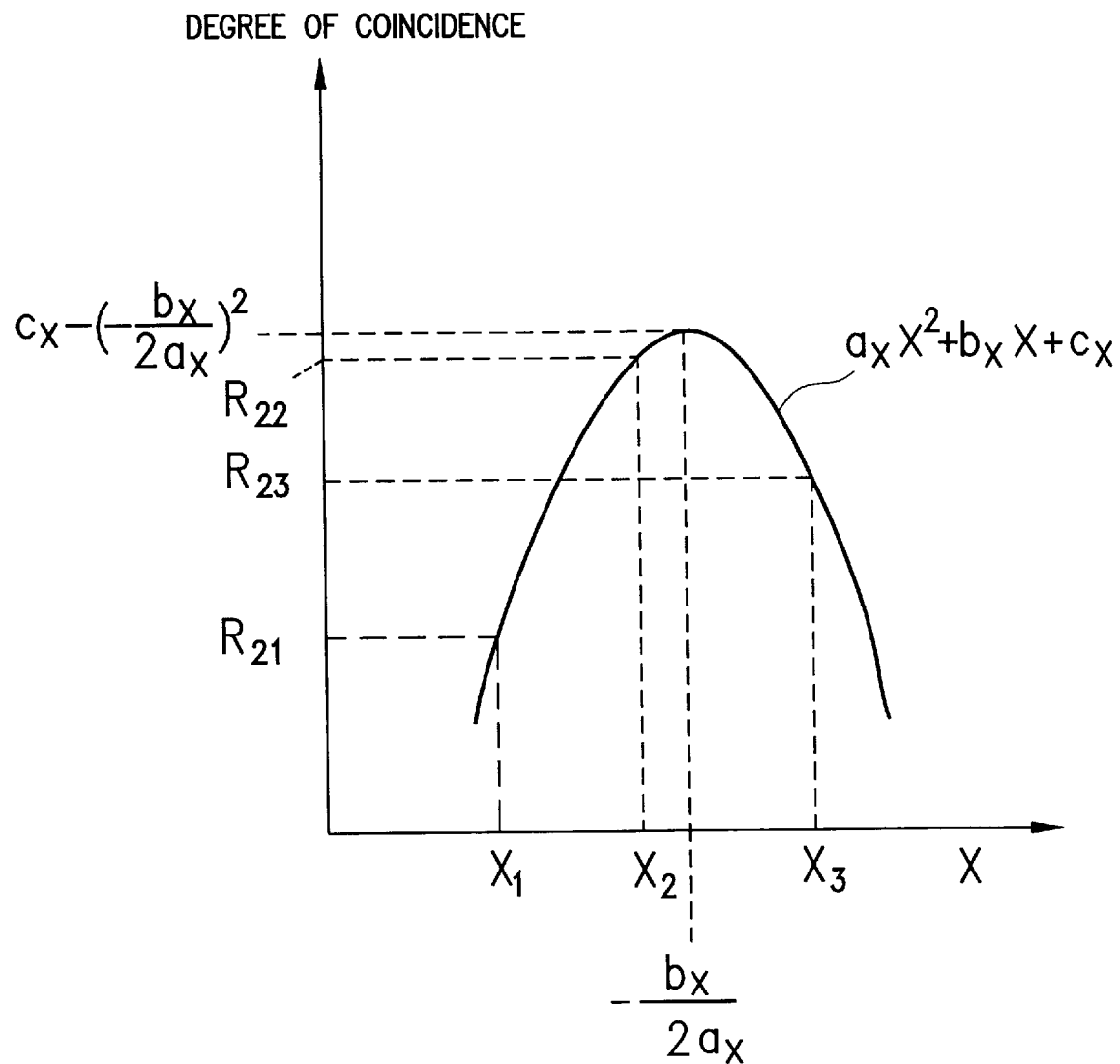

FIG. 15 shows the parabola approximated using the degree of coincidence in the location with the maximum value and the pixel locations contiguous to it and their coordinates (i.e., the locations of these pixels). This method is used to calculate the location of the feature of interest with precision greater than one pixel.

Figure 16:
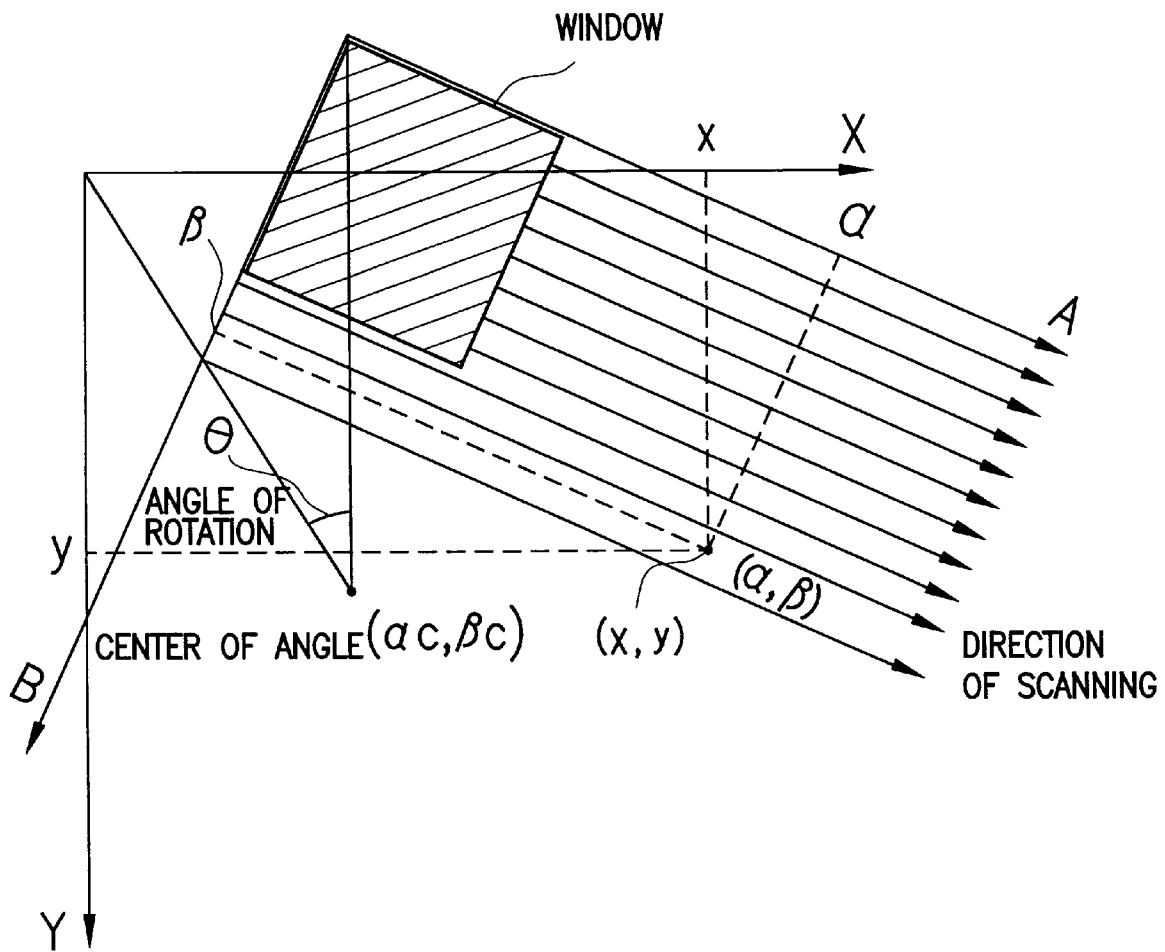

FIG. 16 illustrates an affine transformation.

Figure 17:
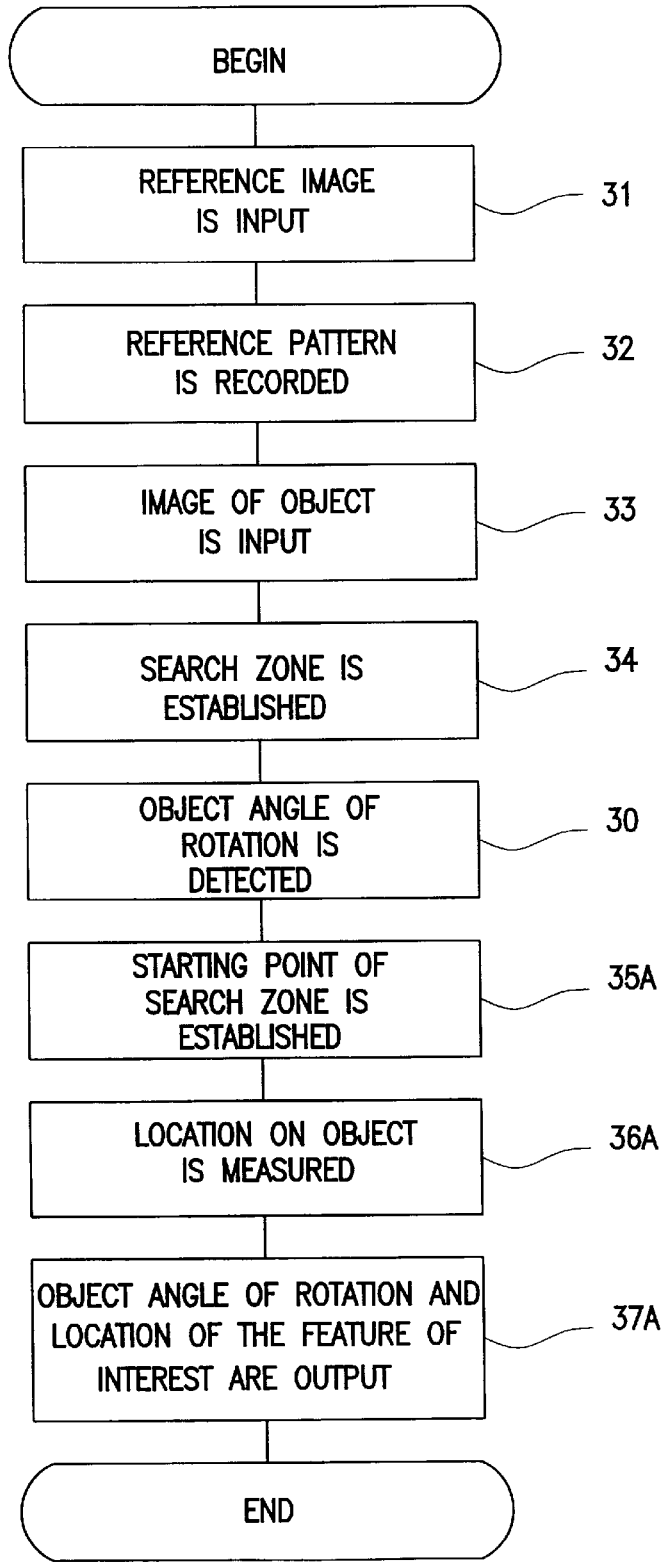

FIG. 17 is a flowchart of the order of processing involved in location measurement of the second embodiment using image processing.

Figure 18:
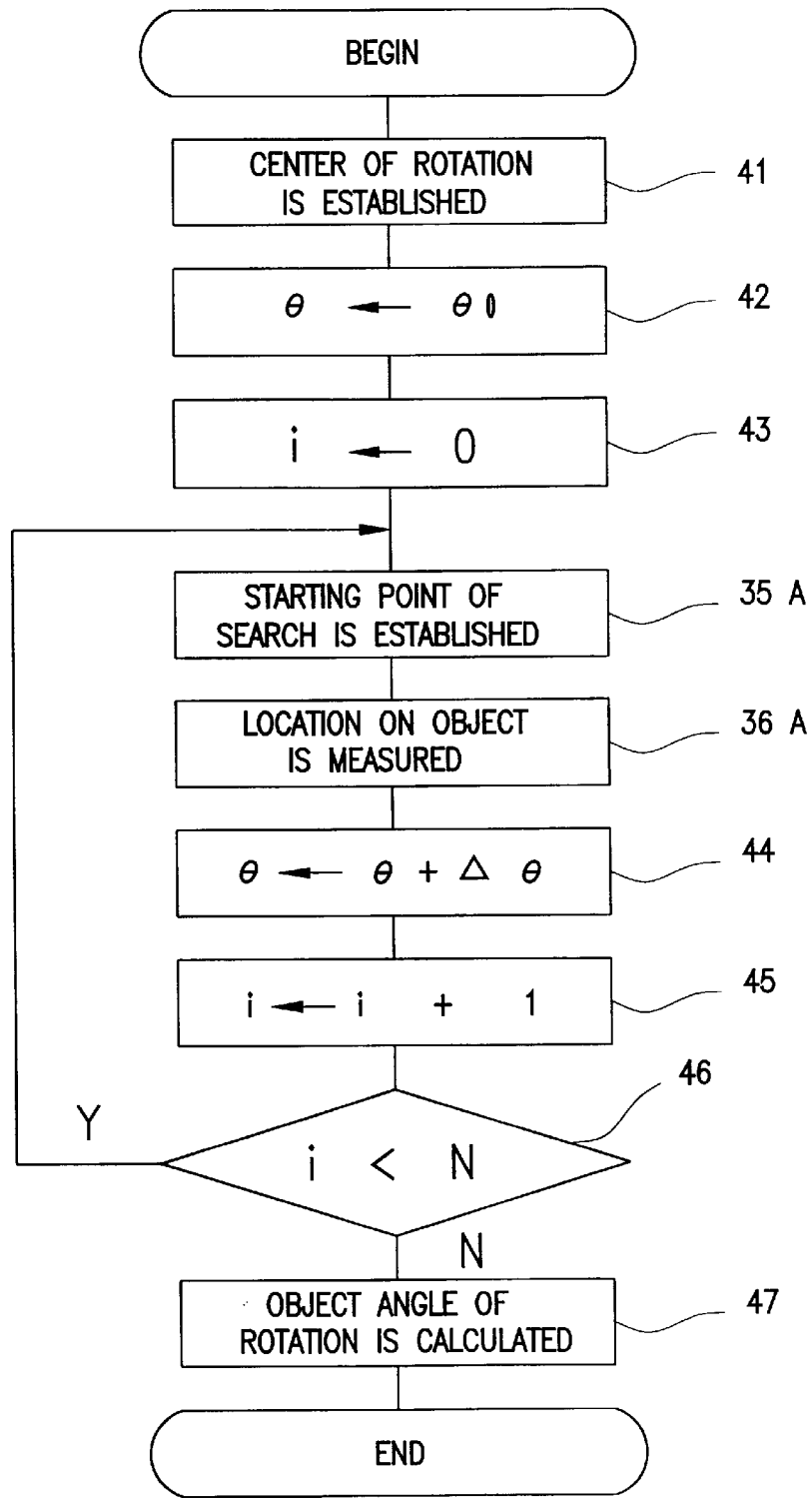

FIG. 18 is a flowchart of the processing used to determine the correct object angle of rotation of the object.

Figure 19:
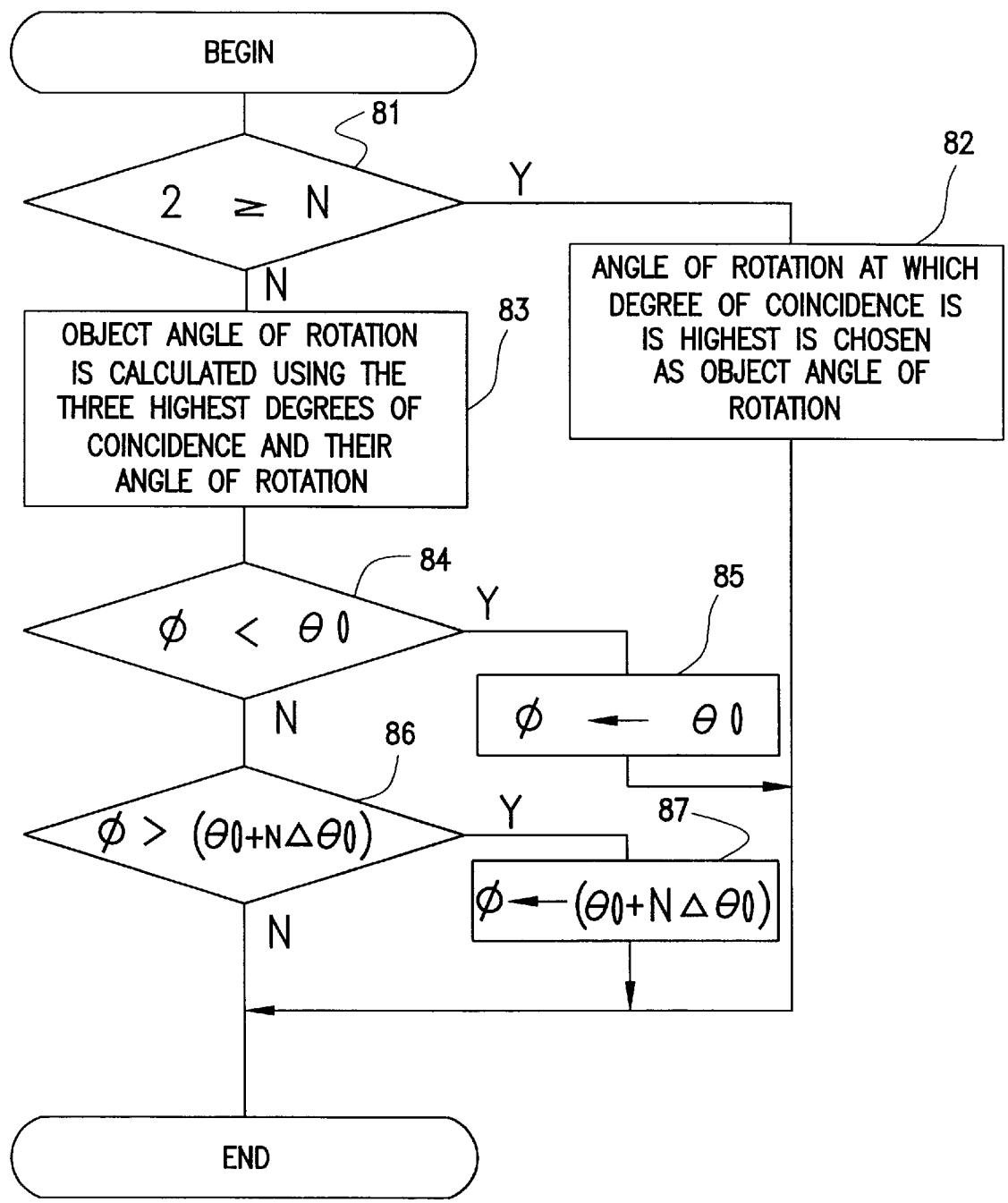

FIG. 19 is a flowchart of the processing used to calculate the correct object angle of rotation of the object.

Figure 20:
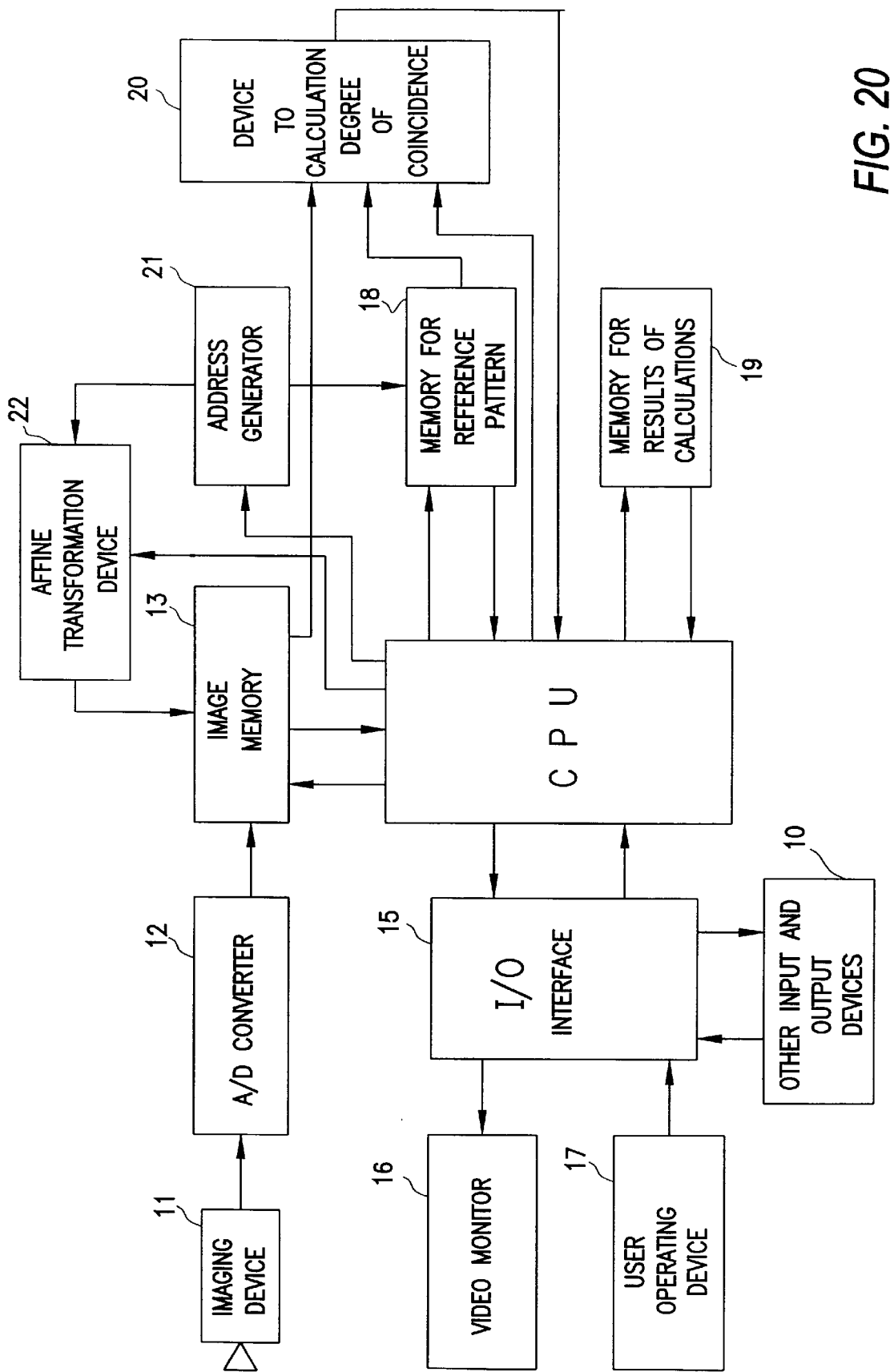

FIG. 20 is a block diagram showing the electrical configuration of a device for location measurement using image processing in which the degree of coincidence is produced by hardware.

Figure 21:
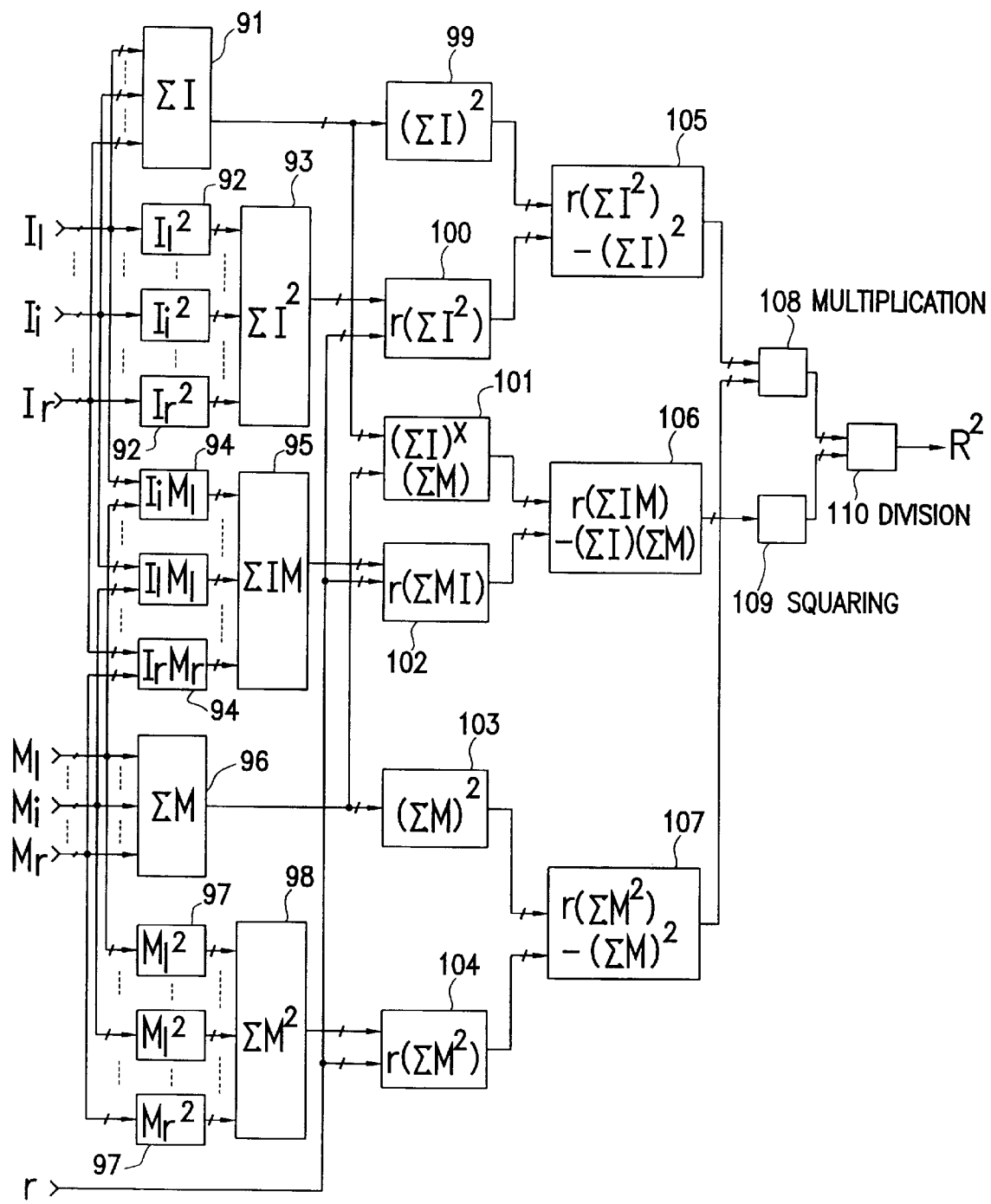

FIG. 21 shows the configuration of a device to calculate degree of coincidence.

DESCRIPTION OF THE PREFERRED EMBODIMENT

1. Configuration of the Hardware

Part I

Figure 1:
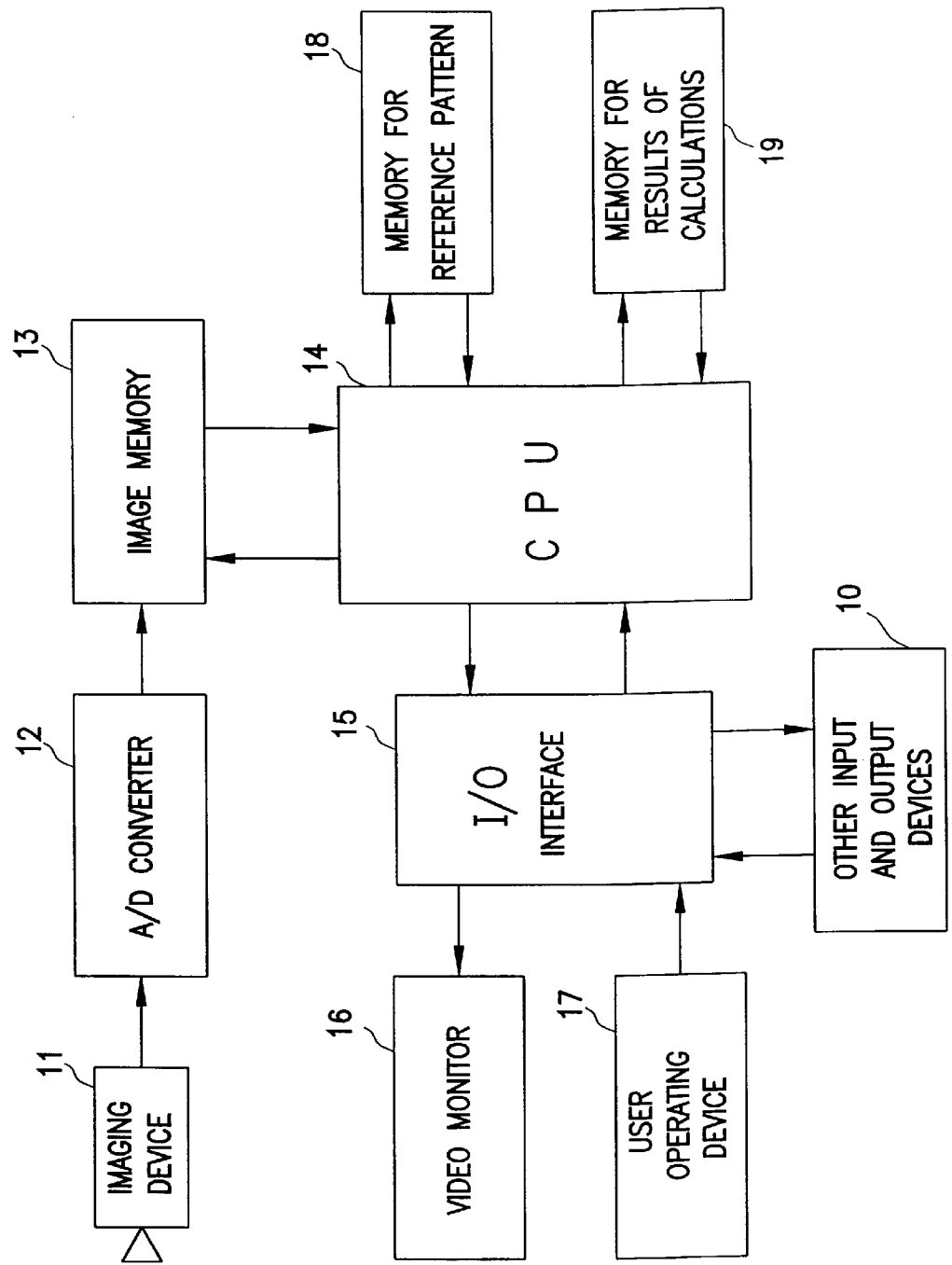
FIG. 1 is a block diagram of the electrical design of a location measurement device employing image processing.

FIG. 1 is a block diagram of the electrical design of a location measurement device employing image processing.

Imaging device 11 captures an image of either a model of the object to be measured or the object itself. The analog video signals obtained by imaging device 11 are output to A/D converter 12.

A/D (analog/digital) converter 12 converts the analog video signals output by imaging device 11 into gray level digital image data (hereinafter to be known simply as "image data").

Image memory 13 stores the image data converted by A/D converter 12.

CPU 14 oversees the operations of the location measurement device employing image processing, and it also performs the calculations required to determine degree of coincidence.

I/O interface 15 inputs and outputs data (i.e., transmits and receives signals) to and from video monitor 16, user operating device 17 and miscellaneous input-output devices 10. Devices 10 include such items as a printer, an external memory device, and a disk memory (such as a hard or floppy disk drive).

Video monitor 16 displays the reference image or the image of the object expressed as image data obtained through I/O interface 15, and it also displays operating instructions for the operator and results of measurement processing.

User operating device 17 allows the operator to specify a location or region in the reference image or the image of the object displayed on video monitor 16. It can take the form of a keyboard or a mouse or other pointing device.

Memory 18 stores image data representing the reference pattern used in the location measurement performed by this measurement device, as will be discussed later.

Memory 19 stores the results of operations performed by CPU 14.

Memories 13, 18 and 19 may be realized by a RAM or the like. A single RAM may be used for all three memories, or a separate RAM may be used for each one. Alternatively, a single RAM may be used for both image memory 13 and reference pattern memory 18.

2. Location Measurement Using Image Processing

Part I

Figure 2:
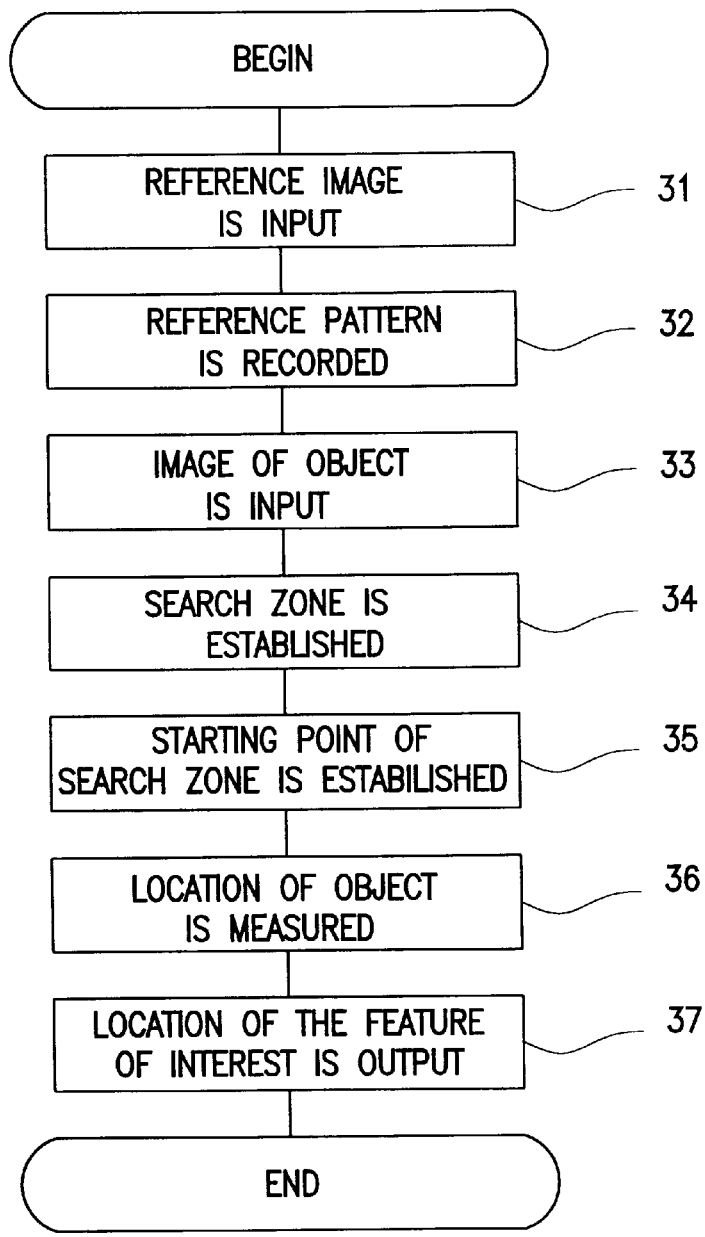
FIG. 2 is a flowchart of the processing involved in position measurement of the first embodiment of this embodiment.

In this section we shall discuss location measurement performed on an object. FIG. 2 is a flowchart of the processing involved in position measurement.

A model of the object to be measured is imaged by imaging device 11. The analog video signals from this device are digitized by A/D converter 12 and stored as image data in memory 13 (Step 31).

Figure 3:
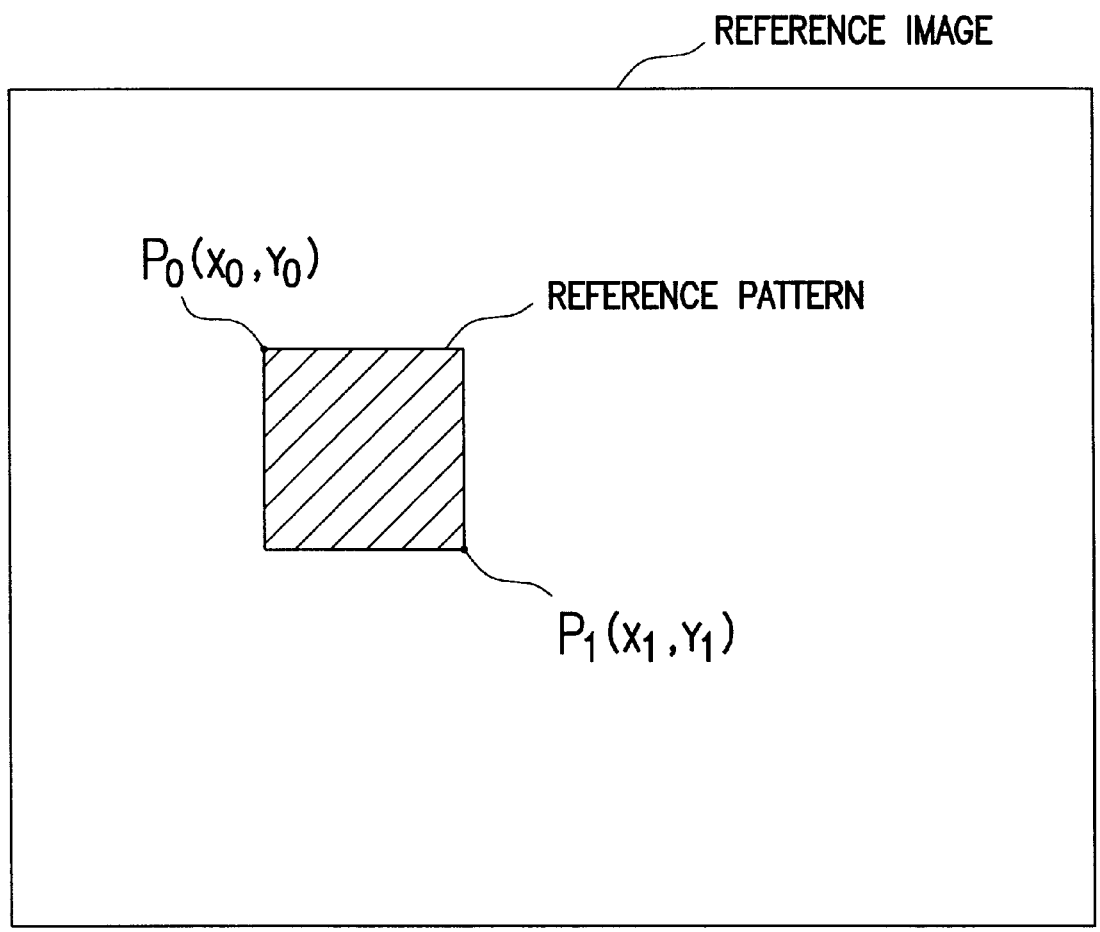
FIG. 3 is an example of a reference pattern.

CPU 14 transmits the image data stored in memory 13 to video monitor 16 by way of I/O interface 15. A reference image expressed in the form of image data is displayed on video monitor 16. FIG. 3 shows an example of a reference image which might be displayed on monitor 16.

Using user operating device 17, the operator specifies the region of the reference image displayed on monitor 16 which is to be recorded as the reference pattern. The reference pattern consists of a square area specified by two of its corners, $P_0$ $(x_0, y_0)$ and $P_1$ $(x_1, y_1)$. The operator indicates where points $P_0$ and $P_1$ should be.

CPU 14 stores the image data representing the reference image within the region indicated by the operator in memory 18 as reference pattern data (Step 32).

The operator designates point $P_0$ $(x_0, y_0)$ as the reference location in the reference pattern which is stored. The size $M_x$ of the reference pattern in dimension X is $x_1-x_0$; in dimension Y it is $y_1-y_0$. The coordinate data for point $P_0$ and the size $M_x$, $M_y$ of the reference pattern are stored in memory 19, the memory for operation results.

CPU 14 displays the reference pattern, in the form of the reference pattern data stored in memory 18, in the top left-hand corner of the screen of video monitor 16.

In the case described above, a portion of the reference image is designated as the reference pattern. The entire reference image can also be used as the reference pattern.

In this way the reference pattern is recorded.

Figure 4:
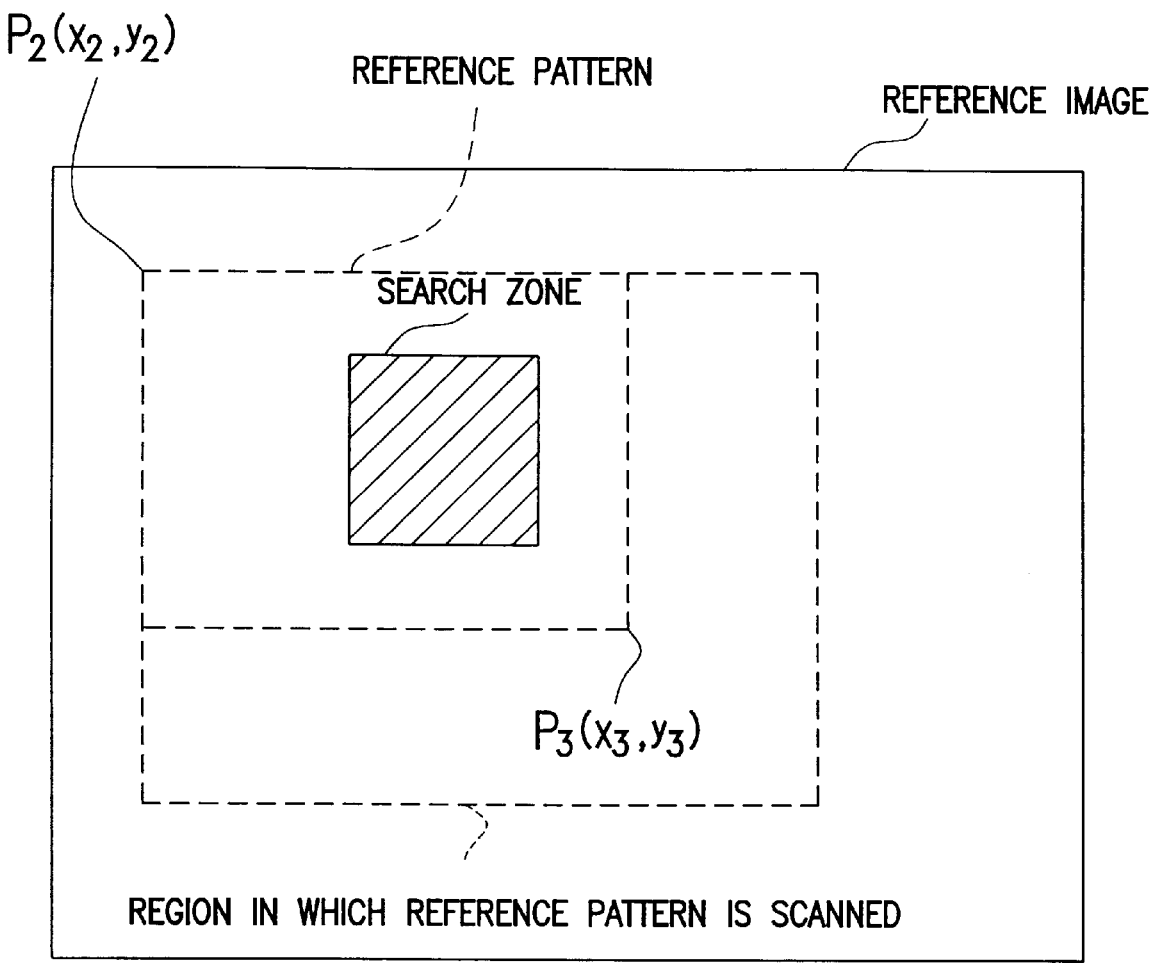
FIG. 4 is an example of an object image.

The object to be measured is imaged by imaging device 11. The video signals from this device are digitized by A/D converter 12 and stored as image data in image memory 13 (Step 33). The object to be measured is displayed on video monitor 16 in the form of the image data stored in image memory 13. FIG. 4 is an example of an image of an object which might be displayed on video monitor 16.

The operator uses user operating device 17 to indicate the region of the image displayed on video monitor 16 where the search for the location of the feature of interest is to take place (hereinafter to be known as the "search zones") (Step 34). The search zone consists of a square area specified by two opposite corners, $P_2$ $(x_2, y_2)$ and $P_3$ $(x_3, y_3)$. The operator indicates where points $P_2$ and $P_3$ should be. CPU 14 stores in memory 19 the coordinate data which identify points $P_2$ and $P_3$, the points which specify the search zone. Those data stored in image memory 13 which represent locations within the search zone will be known as "relevant image data".

In the case described above, a portion of the image of the object is designated as the search zone. The entire image can also be used as the search zone.

CPU 14 uses a window large enough to contain the reference pattern data stored in pattern memory 18 to scan the image data representing the object which are stored in image memory 13. At representative pixel locations in the image data for the object, it performs operations to determine the degree of coincidence between the reference pattern data and the image data in the window. Pixel locations with a high degree of coincidence are designated as starting points for searches (Step 35).

Figure 5:
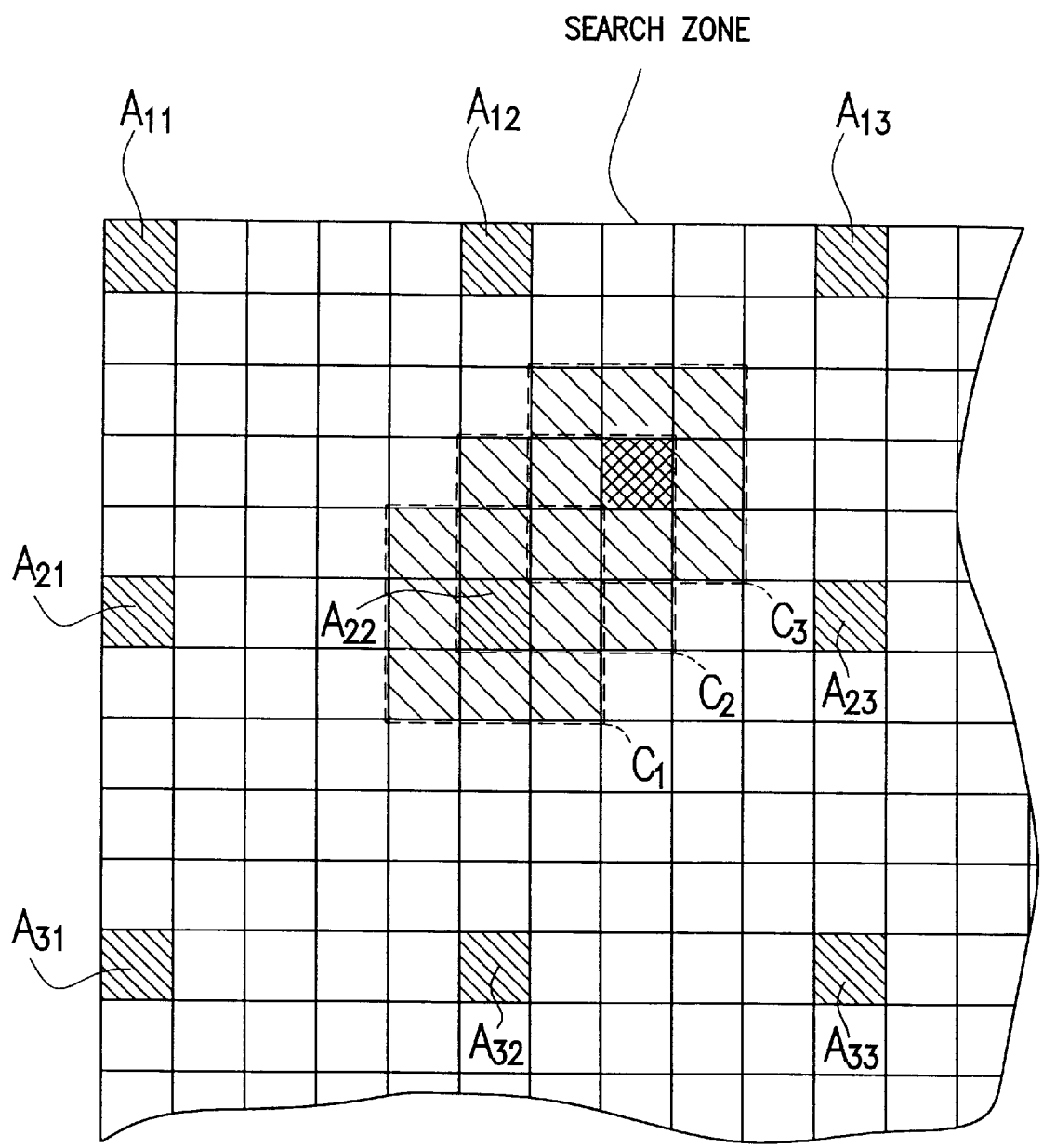
FIG. 5 illustrates the positioning of the window used to determine the starting point of the search.
Figure 6:
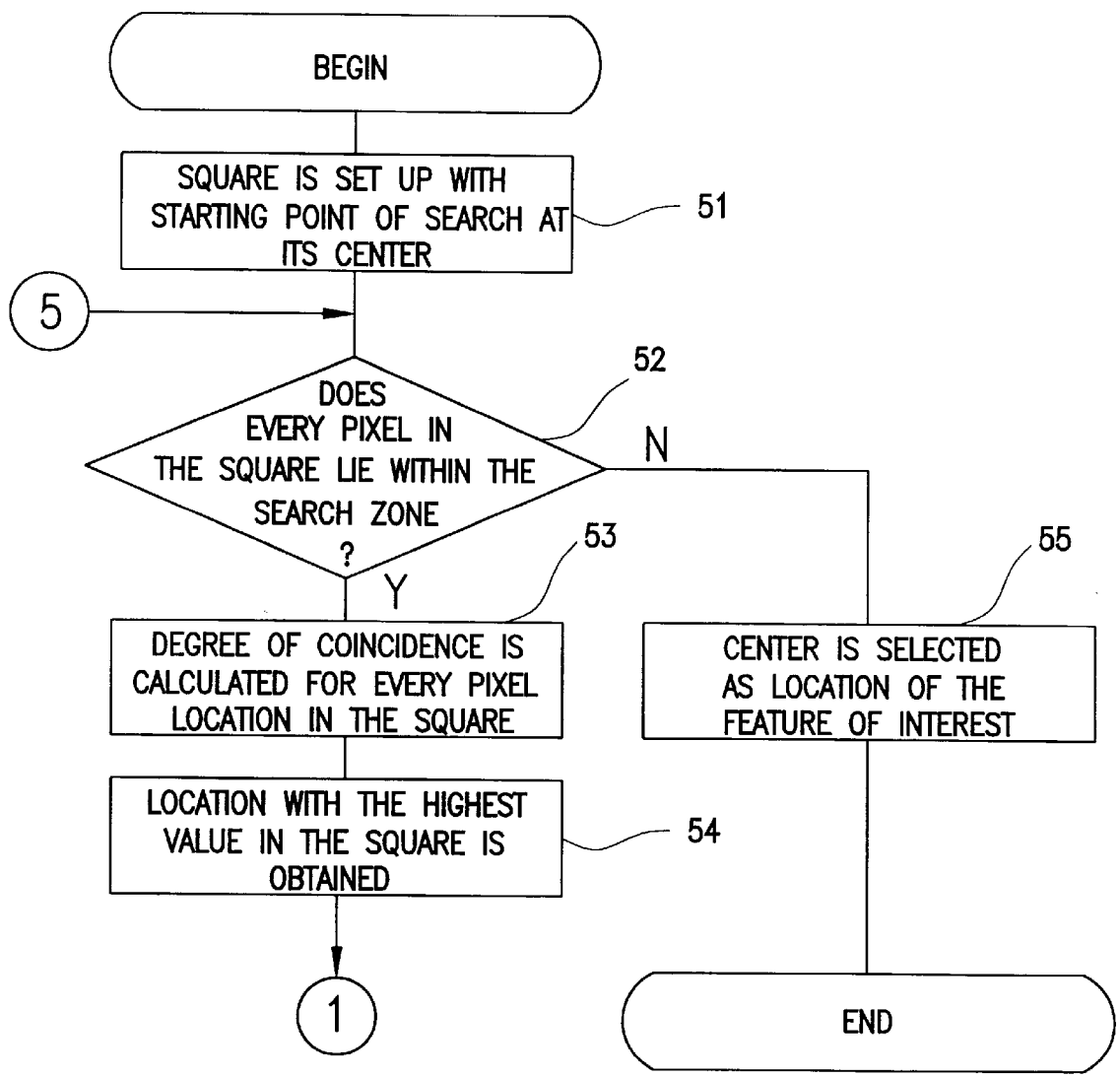
FIG. 6 is part of a flowchart showing a detailed order of processing for location measurement.
Figure 7:
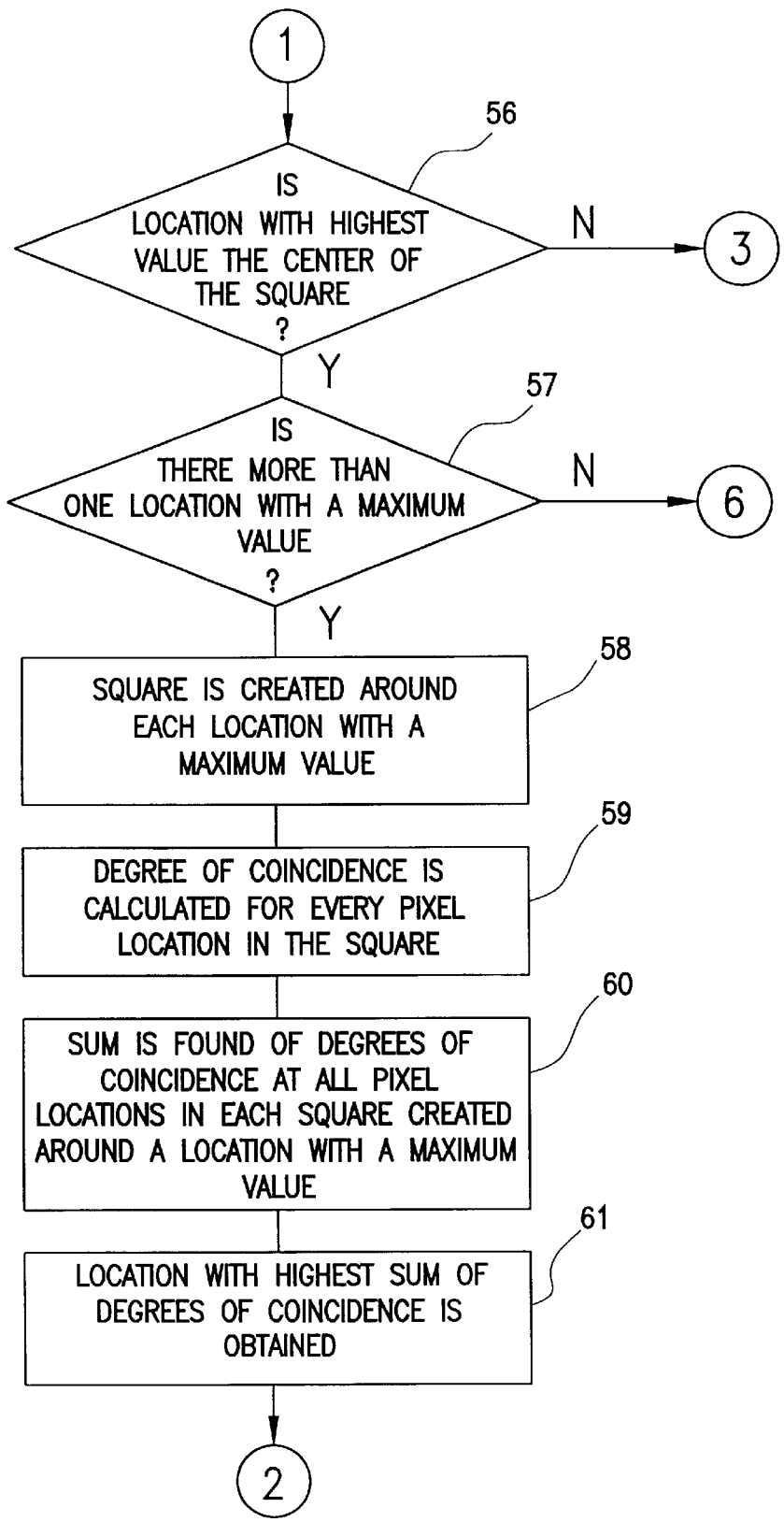
FIG. 7 is part of a flowchart showing a detailed order of processing for location measurement.
Figure 8:
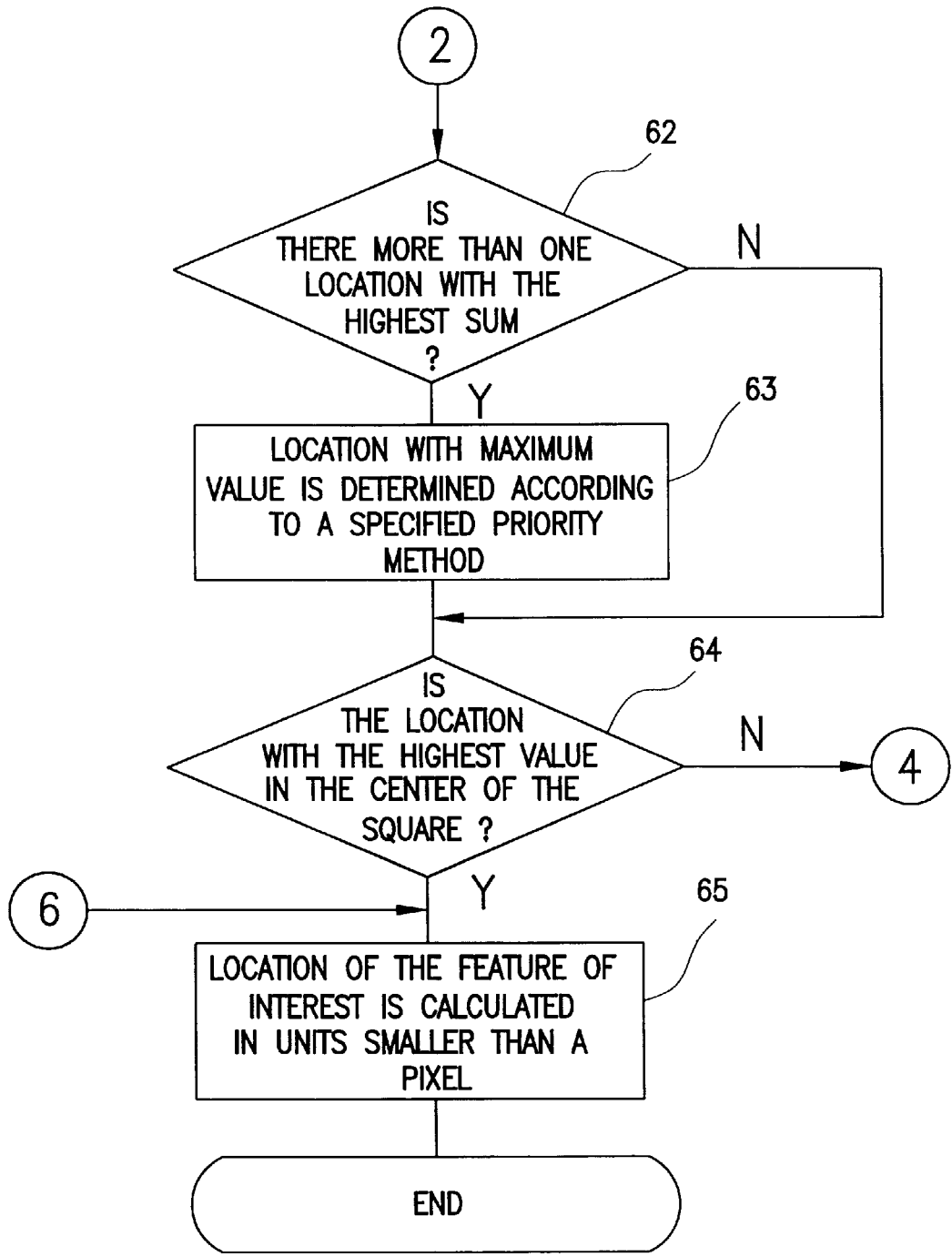
FIG. 8 is part of a flowchart showing a detailed order of processing for location measurement.
Figure 9:
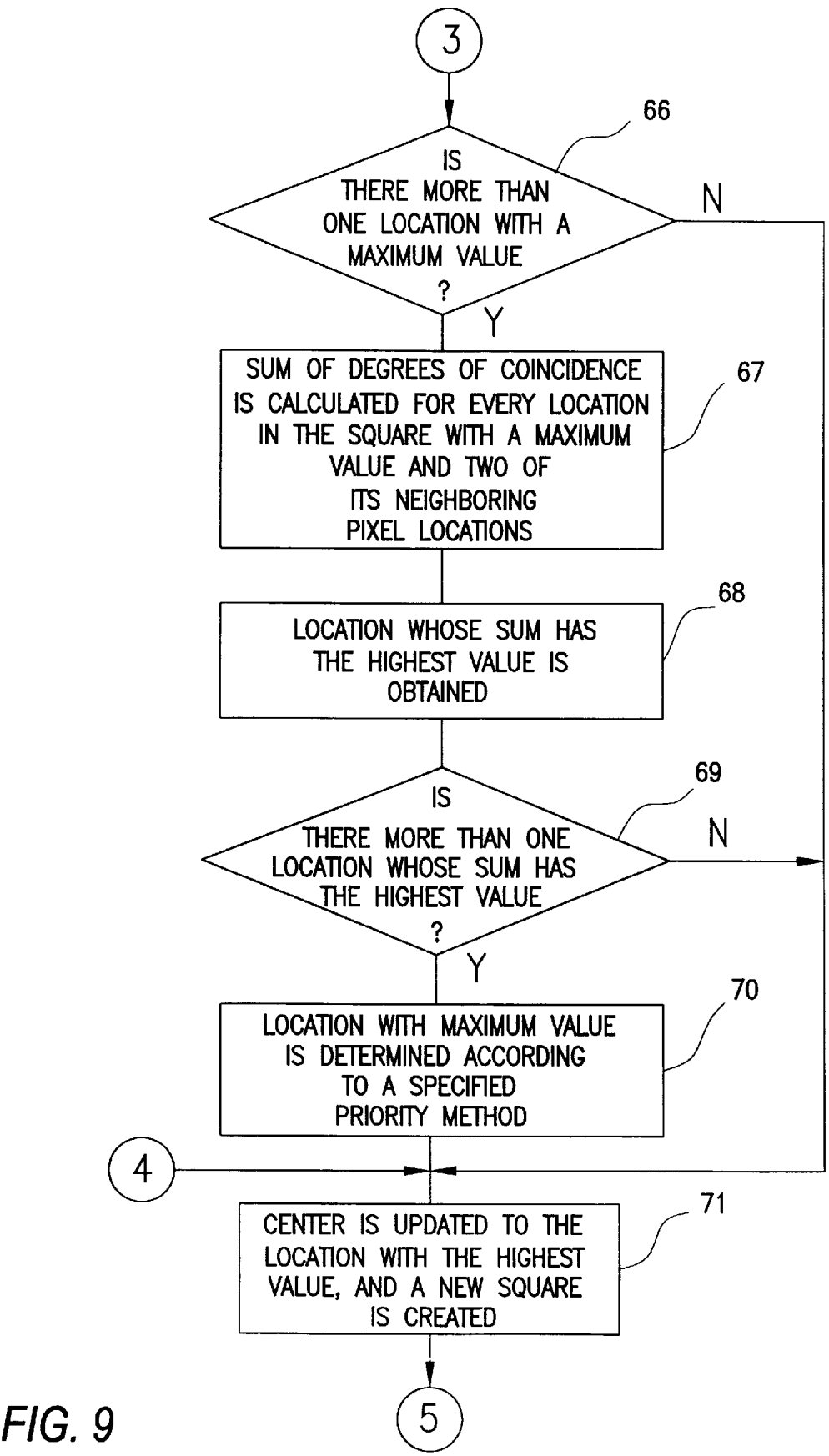
FIG. 9 is part of a flowchart showing a detailed order of processing for location measurement.

FIG. 5 is an enlargement of a portion (the top left-hand corner) of the search zone pictured in FIG. 4. The representative pixels (shown by fine hatching) are found at intervals of four pixels in both the horizontal and vertical dimensions. These are pixels $A_{11}, A_{12}, A_{13}, \ldots, A_{21}, A_{22}, A_{23}, \ldots,$ and $A_{31}, A_{32}, A_{33}$. $C_1$, $C_2$ and $C_3$ are the square areas discussed above.

One way to calculate the degree of conformity at the representative pixel locations would be to use the normalized correlation expressed in Formula (1). The normalized correlation coefficient R would be calculated for each representative pixel location in the search zone.

$$R^2 = \frac{[r(\sum IM) - (\sum I)(\sum M)]^2}{[r(\sum I^2) - (\sum I)^2] \cdot [r(\sum M^2) - (\sum M)^2]}. \qquad \text{FORMULA 1}$$

CPU 14 would store the normalized correlation coefficient R calculated by solving Formula (1) (by means of software) in memory 19.

When CPU 14 has calculated the degree of coincidence for every representative pixel location in the search zone, it searches memory 19 for the pixel location with the highest degree of conformity and selects this location as the starting point for a search (Step 35).

When the starting point has been determined, it is made the center point of a square area (the search zone) consisting of that pixel and the eight pixels surrounding it. The degree of conformity is then calculated for each pixel location in this square. If the location with the highest degree of conformity is in the center of the square, this location is determined to be the location of the feature of interest. If the location with the highest degree of conformity is not in the center of the square, a new search zone is established with this location as its center. The center point of the search zone continues to be changed until the pixel location with the highest degree of conformity is in the center of the zone. The location of the feature of interest obtained in this manner is calculated in units smaller than a pixel (Step 36).

The location of the item to be measured (the location of the feature of interest) calculated in this way is output (i.e., it is displayed on the video monitor) (Step 37).

After the representative pixel location with the highest degree of coincidence in the search zone is selected as the starting point, a search is made for the location with the highest coincidence among the pixels surrounding that point. In this way, the number of operation cycles required to calculate coincidence can be substantially reduced. This allows the measurement process to be performed in significantly less time. This effect is particularly beneficial when the calculations leading to a coincidence coefficient are performed by software.

FIGS. 6, 7, 8 and 9 are a flowchart of the detailed order of processing in a fine location calculating means to search for a feature site from a starting point and measure its fine location in units smaller than a pixel.

CPU 14 creates a square area (the search zone) by using the starting point selected in Step 35 as the center of a square consisting of it and the surrounding eight pixels (Step 51). FIG. 10 shows this square search zone. $S_{11}, S_{12}, \ldots, S_{32}$ and $S_{33}$ are the numbers given to the pixel locations in order to distinguish them for the purpose of the explanation. Location $S_{22}$ is the starting point (i.e., the center point) of the search. The size of this square is not limited to 3×3 pixels; a larger search zone could be created if desired.

Suppose, for example, that representative pixel location $A_{22}$ in FIG. 5 is the starting point of our search. The search zone would then be square $C_1$.

First, it must be determined whether every pixel within the square which has been created is in the search zone (Step 52).

If it is determined that not every pixel in the square lies within the search zone, that is, that one or more of the pixels in the square are outside the search zone (if the answer is "No" in Step 52), the starting point of the search (the center of the square) is selected as the location of the feature of interest (Step 55).

If it is determined that every pixel in the square lies within the search zone (if the answer is "Yes" in Step 52), the degree of coincidence between the reference pattern data and the image data is calculated for every pixel in the square except those whose degree of coincidence has already been found. The resulting coincidence values are stored in memory 19 (Step 53).

For example, since every pixel in square $C_1$ lies within the search zone, the coincidence value of every pixel location in the square is calculated, with the exception of representative pixel location $A_{22}$, whose coincidence value has already been calculated.

Memory 19 is searched, and the pixel locations with the highest coincidence values in the square (hereafter, the "location with the maximum value") are obtained (Step 54). It is then determined whether the center point of the square (i.e., the starting point of the search) is one of the locations with the maximum value (Step 56).

If the center point of the square (i.e., the starting point of the search) is one of the locations with the maximum value (if the answer is "Yes" in Step 56), it is determined whether more than one location has the maximum value (Step 57).

If it is determined that more than one location has the maximum value (if the answer is "Yes" in Step 57), a square is created around each location with a maximum value (Step 58). The coincidence value is calculated for every pixel location in every square surrounding a location with a maximum value, with the exception of locations whose values have already been calculated (Step 59). The resulting coincidence values are stored in memory 19.

Figure 11A:
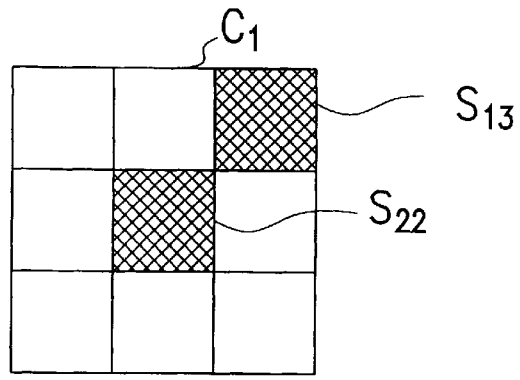
Figure 11B:
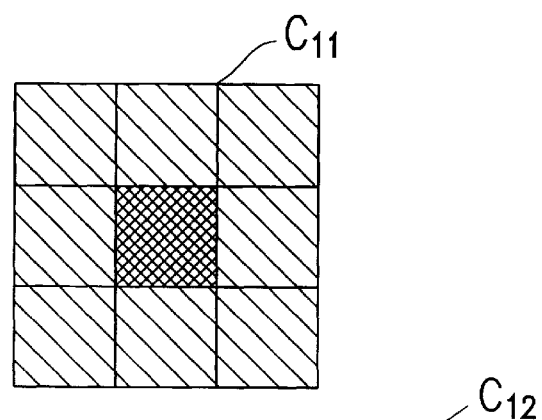
Figure 11C:
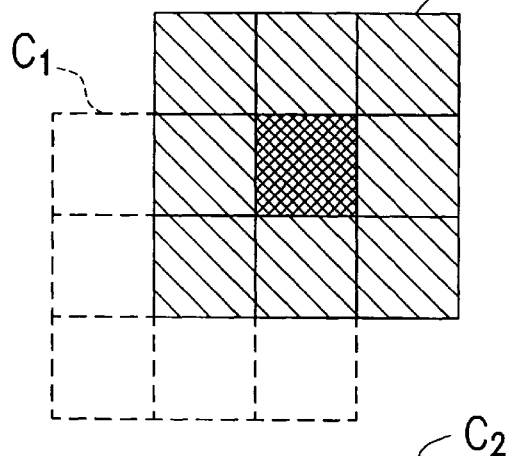
Figure 11D:
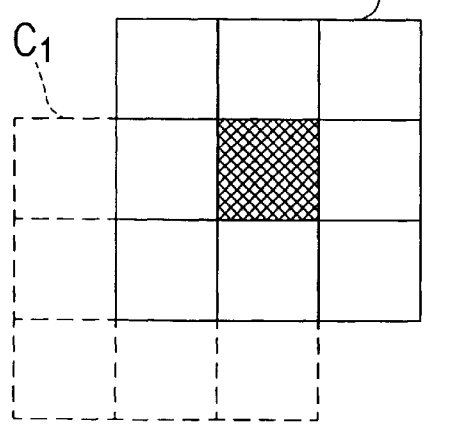
Figure 13A:
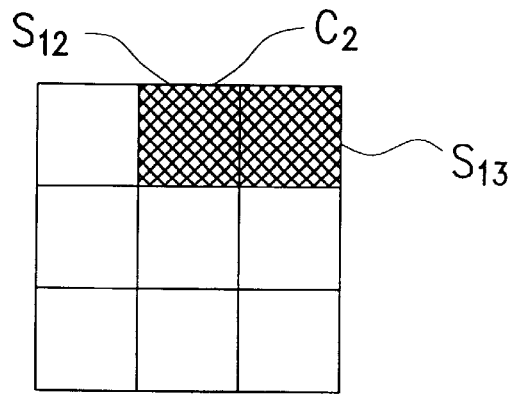
Figure 13B:
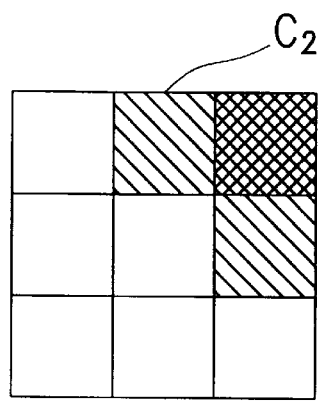
Figure 13C:
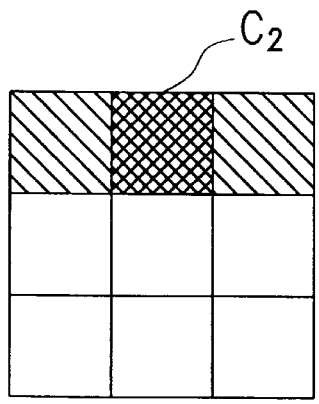
Figure 13D:
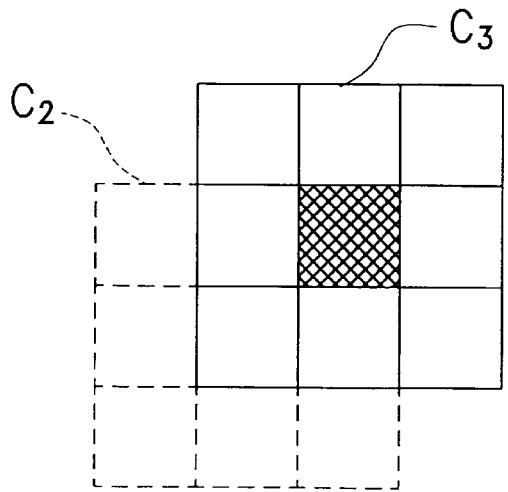

Let us suppose, for example, that the locations in square $C_1$ in FIG. 11(A) which have the maximum coincidence value are $S_{13}$ and $S_{22}$, and that these locations have the same value. A separate square is then created around each of these locations. For $S_{22}$, square $C_{11}$ is created, as shown in FIG. 11(B). For $S_{13}$, square $C_{12}$ is created, as shown in FIG. 11(C).

CPU 14 reads out of memory 19 the coincidence values for the locations in the squares whose values have already been calculated, and calculates the values for the remaining locations. It then finds the sum of the coincidence values of all nine pixels in each square set up around a location with a maximum value (Step 60).

CPU 14 determines which location has the greatest sum of coincidence values (hereafter, "the location with the maximum sum") (Step 61). It then determines whether more than one location has the greatest sum (Step 62).

If it determines that more than one location has the greatest sum (if the answer in Step 62 is "Yes"), it determines which one should be considered the location with the maximum sum according to the priority shown in FIG. 12 (Step 63). The method shown in FIG. 12 gives the maximum priority to the center and then moves in descending order from the upper left to the lower right. It would also be permissible to move from the upper right to the lower left. The location with the maximum value could also be determined by some other priority method.

If it is not the case that there are a number of locations whose sums have the maximum value, i.e., if it is determined that only one location has a sum with the maximum value (if the answer in Step 62 is "No"), this location is considered to be the location with the maximum coincidence value.

When the location with the highest value has been found, it is determined whether this location is in the center of the square (i.e., at the starting point of the search) (Step 64).

If it is determined that the location with the highest value is not in the center of the square (if the answer in Step 64 is "No"), this location is used as the center around which a new square is established (Step 71). We then return to Step 52 and execute the entire processing for the new square.

In the example shown in FIG. 11, the sums are found of the coincidence values of all the pixels in squares $C_{11}$ and $C_{12}$, which are created around locations $S_{13}$ and $S_{22}$. If the sum of the values for square $C_{12}$ surrounding $S_{13}$ is greater, the center point is changed from $S_{22}$, the center of square $C_1$, to $S_{13}$, and a new square $C_2$ is created, as shown in FIG. 11(D) (See also FIG. 5).

If it is determined in Step 56 that the center of the square is not one of the locations with the highest value (if the answer in Step 56 is "No"), it is determined whether more than one location has the highest value (Step 66).

If it is determined that more than one location has the highest value (if the answer in Step 66 is "Yes"), the coincidence values are read out of memory 19 for each location with a maximum value in the square and for the two pixels above and below it or those on either side. The sums of the coincidence values for these three pixels are found for every location with a maximum value (Step 67).

For example, let us assume that locations $S_{12}$ and $S_{13}$ have the highest coincidence values in square $C_2$, shown in FIG. 13 (A), and that both have the same value. Since the two pixels contiguous to $S_{13}$, as shown in FIG. 13(B), are $S_{12}$ and $S_{23}$, the sum of the coincidence values for these three pixels is found. For $S_{12}$, we choose the contiguous pixels $S_{11}$, and $S_{13}$, and find the sum of their coincidence values.

The location whose sum has the greater value (hereafter "the location whose sum has the maximum value") is determined (Step 68). It is then determined whether more than one location has a sum with the maximum value (Step 69).

If more than one location has a sum with the maximum value (if the answer in Step 69 is "Yes"), the location which will be considered to have the maximum value is determined according to the priority method shown in FIG. 14 (Step 70). The center pixel in the square shown in FIG. 14 is not given a priority because the center of the square was not one of the locations with a maximum value (the answer in Step 56 was "No"). In the priority method shown in FIG. 14, priorities are assigned clockwise from the upper left; they could also be assigned counterclockwise from the upper right, or in some other way entirely.

If it is determined that there is only one location whose sum has the maximum value (if the answer in Step 69 was "No"), that location is considered to be the location with the maximum value.

Once the location with the maximum coincidence value has been determined, it becomes the center of a new square which is set up around it (Step 71).

In the example shown in FIG. 13, $S_{13}$ was the location with the highest value. The center point is changed from $S_{22}$, the center of square $C_2$, to $S_{13}$, and a new square, $C_3$, is set up (See FIG. 13(D) and FIG. 5).

If it is determined in Step 64 that the location with the highest value is in the center of the square (If the answer in Step 64 is "Yes"), the location of the feature of interest on the object is calculated in units smaller than a pixel as follows (Step 65).

The coincidence values at locations $S_{12}$ and $S_{32}$, which lie above and below the center of the square, $S_{22}$, and at locations $S_{21}$ and $S_{23}$, which lie to its left and right, are used to perform a parabolic approximation and thereby determine the location of the feature of interest with a precision greater than one pixel. This location is considered to be the fine location of the feature of interest.

If we call the degree of coincidence at pixel location $S_{ij}$ (with coordinates $X_i$, $Y_j$) $R_{ij}$, the approximated parabola can be expressed as shown in FIG. 15. This parabola is expressed by equations (2), (3) and (4) using coefficients $a_x$, $b_x$ and $c_x$.

$$R_{21} = a_x X_1^2 + b_x X_1 + c_x \quad (2)$$

$$R_{22} = a_x X_2^2 + b_x X_2 + c_x \quad (3)$$

$$R_{23} = a_x X_3^2 + b_x X_3 + c_x \quad (4)$$

The degree of coincidence at locations $S_{21}$, $S_{22}$ and $S_{23}$ is read out of memory 19. By solving equations (1) through (3), we can calculate coefficients $a_x$, $b_x$ and $c_x$. The Y coordinate is found in the same way, by calculating coefficients $a_y$, $b_y$ and $c_y$.

Using the coefficients $a_x$, $b_x$, $a_y$ and $b_y$ which we have obtained, we can calculate, by means of the following formulae, the fine location U ($U_x$, $U_y$) with a precision greater than one pixel.

$$U_x = -(b_x)/(2a_x) \quad (5)$$

$$U_y = -(b_y)/(2a_y) \quad (6)$$

In this way the exact fine location U ($U_x$, $U_y$) on the object can be calculated with a precision greater than one pixel.

It is also possible to calculate the fine location of the feature of interest by calculating the barycenter as given below, using the degree of coincidence of each pixel location in the square.

$$U_x = \frac{\sum_{j=1}^{3}\sum_{i=1}^{3}(R_{ij} \cdot X_i)}{\sum_{j=1}^{3}\sum_{i=1}^{3} R_{ij}} \quad \text{Formula 2}$$

$$U_y = \frac{\sum_{j=1}^{3}\sum_{i=1}^{3}(R_{ij} \cdot Y_j)}{\sum_{j=1}^{3}\sum_{i=1}^{3} R_{ij}} \quad \text{Formula 3}$$

Using the method described above, we can calculate the location of the feature of interest on the object with a precision greater than one pixel. Calculating this site in units smaller than a pixel allows the site to be determined very accurately.

3. Location Measurement Using Image Processing

Part II

A location on an object can be measured accurately even if something has caused the object to rotate.

In this second ideal embodiment, the image expressed as the image data stored in image memory 13 is rotated by means of an affine transformation, and the degree of coincidence between the stored reference pattern and the image data in a window large enough to contain the reference pattern is calculated. It would also be possible to rotate the reference pattern instead of the image data.

If the addresses which read out the image data from image memory 13 are advanced in an oblique direction, the image will assume an oblique orientation. In other words, this method can be used to rotate the image. An affine transformation is ideally suited for this purpose. If we use a rough approximation of the addresses to read out the image data, we can reduce the image; if we give the addresses in detail, we can enlarge it.

As is shown in FIG. 16, the system used to show the data before the transformation is an A-B (alpha-beta) coordinate system; after the transformation the data are labeled with an X-Y coordinate system. Pixel locations (i.e., the coordinates of the locations) in the image before the transformation are labeled ($\alpha$, $\beta$); those shown after the transformation are labeled (x, y). The center of rotation is ($\alpha_c$, $\beta_c$); $\theta$ is the angle of rotation. k is the magnification with respect to enlargement or reduction. In this case, the affine transformation can be expressed by the following formula.

$$\begin{bmatrix} x \\ y \end{bmatrix} = \begin{bmatrix} k \cdot \cos\theta & k \cdot \sin\theta & k \cdot \alpha c \\ k \cdot \sin\theta & k \cdot \cos\theta & k \cdot \alpha c \end{bmatrix} \begin{bmatrix} \alpha - \alpha c \\ \beta - \beta c \\ 1 \end{bmatrix} \quad \text{FORMULA 4}$$

$$= \begin{bmatrix} (\alpha - \alpha c) \cdot k \cdot \cos\theta + (\beta - \beta c) \cdot k \cdot \sin\theta + k \cdot \alpha c \\ (\alpha - \alpha c) \cdot k \cdot \sin\theta + (\beta - \beta c) \cdot k \cdot \cos\theta + k \cdot \alpha c \end{bmatrix}$$

Since in this embodiment only rotation by means of the affine transformation is used (by changing the angle of rotation $\theta$), magnification k for enlargement or reduction will be equal to 1. It would also be acceptable to vary both the angle of rotation $\theta$ and the magnification k during location measurement.

FIG. 17 is a flowchart of the order of processing involved in location measurement (of the second type) performed as the image stored in memory 13 is rotated. The processes which are identical to those in FIG. 2 have been given the same numbers, and we shall omit a detailed explanation of them here.

When the operator has designated the search zone, an angle is found for the relative rotation of the object and the reference pattern, as will be discussed in detail in a later section (hereafter, this angle of rotation will be known as "the object angle of rotation", and it will be expressed as $\phi$). The starting point of the search is determined at this object angle of rotation (Step 35A), and the location on the object is measured (Step 36A). The processing in Steps 35A and 36A is identical to that in Steps 35 and 36, with the exception of the fact that the image represented by the image data stored in memory 13 is rotated at angle $\phi$ by means of an affine transformation.

The object angle of rotation and the fine location obtained in this way are output (i.e., they are displayed on video monitor 16) (Step 37A).

FIG. 18 is a flowchart of the processing involved in detecting the correct object angle of rotation which is being rotated.

CPU 14 sets a center of rotation for the affine transformation and an initial angle of rotation (Steps 41 and 42). The center of the search zone ($\alpha_c$, $\beta_c$) is used as the center of rotation for the affine transformation. Since the search zone is defined by points $P_2$ ($x_2$, $y_2$) and $P_3$ ($x_3$, $y_3$), the center of the search zone may be expressed as ($\alpha_c$, $\beta_c$)=($\{x_2-x_3\}/2$, $\{y_2-y_3\}/2$). The initial angle of rotation $\theta 0$ is already set.

CPU 14 initializes the current processing cycle i to 0 (Step 43). The total number of cycles N has already been set.

CPU 14 calculates the degree of coincidence at representative pixel locations with respect to the image (i.e., the image data stored in memory 13) which has been rotated over angle $\theta$ by the affine transformation. It then selects the location with the highest degree of coincidence to be the starting point of the search (Step 35A). Starting from this point, a search is conducted to locate the location of the feature of interest (Step 36A). The location of the item to be measured (i.e., the location of the feature of interest) and the degree of coincidence which are obtained are stored in memory 19 after every rotation over angle $\theta$.

CPU 14 increases angle of rotation $\theta$ by increments of $\Delta\theta$ (Step 45) and increments i (Step 46). The processing in Steps 35A through 45 is repeated until i reaches the total number of cycles N which was previously set (Step 47).

When i is equal to N, CPU 14 calculates an object angle of rotation $\phi$ which is smaller than the incremental angle $\Delta\theta$ (Step 47), as will be explained hereafter.

FIG. 19 is a flowchart of the order of processing entailed in calculating the object angle of rotation of the object.

CPU 14 determines whether the total number of processing cycles N is less than 2 (Step 81). If it is (if the answer in Step 81 is "Yes"), it searches memory 19 for the angle of rotation with the highest degree of coincidence, and it selects this angle as object angle of rotation $\phi$ (Step 82).

If the total number of processing cycles is greater than 2 (if the answer in Step 81 is "No"), CPU 14 searches memory 19 for the three highest degrees of coincidence, and it reads out these values and their associated angles of rotation. Using these data, it calculates object angle of rotation $\phi$ by means of a parabolic approximation.

CPU 14 then determines whether the object angle of rotation $\phi$ which it has calculated is smaller than the initial angle of rotation $\theta 0$ (Step 84). If object angle of rotation $\phi$ is greater than angle $\theta 0$ (if the answer in Step 84 is "No"), CPU 14 determines whether object angle of rotation $\phi$ is larger than the final angle of rotation ($\theta 0+N\Delta\theta$) (Step 86).

If object angle of rotation is smaller than the final angle of rotation ($\theta 0+N\Delta\theta$) (if the answer in Step 86 is "No"), CPU 14 selects this value as the final object angle of rotation $\phi$. If object angle of rotation ($\theta 0+N\Delta\theta$) is greater than the final angle of rotation ($\theta 0+N\Delta\theta$) (if the answer in Step 86 is "Yes"), CPU 14 selects the final angle of rotation ($\theta 0+N\Delta\theta$) as the final object angle of rotation $\phi$ (Step 87).

The object angle of rotation is calculated as described above.

4. Configuration of the Hardware

Part II

In the device configured as shown in FIG. 1, the calculations involved in finding degree of coincidence (a normalized correlation value produced by solving Formula (1)), were performed by CPU 14 by means of software. FIG. 20 is an electrical diagram of a device in which the calculations required to find degree of coincidence are performed by a calculation device for that purpose. Components in FIG. 20 which are identical to those in FIG. 1 are given the same numbers, and they will not be explained in detail here.

The calculations involved in producing degree of coincidence are performed by calculation device 20, address generator 21 and affine transformation device 22 in response to data received from CPU 14.

When CPU 14 is made to perform the calculations necessary to produce a degree of coincidence, it transmits to calculation device 20 the number of data r in the reference pattern; to address generator 21, the pixel locations and size of the reference pattern ($M_x$, $M_y$) to which the degree of coincidence is to be calculated; and to affine transformation device 22, the angle of rotation $\theta$ and the center of rotation ($\alpha_c$, $\beta_c$) for the affine transformation.

On the basis of the pixel locations and the size of the reference pattern ($M_x$, $M_y$) for the image data which it has received from CPU 14, address generator 21 generates an address for the image data (hereafter, "reference pattern data $M_i$") at each pixel location in the reference pattern stored in memory 18. It also generates an address for the image data (hereafter, "image data $I_i$") at each pixel location in the image data stored in memory 13. Address generator 21 transmits the addresses associated with the reference pattern to reference memory 18, and those associated with the image to affine transformation device 22.

On the basis of angle of rotation $\theta$ and the center of rotation ($\alpha_c$, $\beta_c$), affine transformation device 22 performs an affine transformation on the image addresses it receives from address generator 21 and transmits the transformed data to image memory 13.

Since there is no need to perform an affine transformation in the situation described in "Location Measurement Using Image Processing: Part I", there is no need for affine transformation device 22. In this case, CPU 14 would not output the angle of rotation or the center of rotation for the transformation. Instead, the image addresses generated by address generator 21 would be transmitted directly to image memory 13.

Calculation device 20 uses the reference pattern data $M_i$ which were read out of memory 18, the image data $I_i$ read out of memory 13 and the number of reference data r transmitted by CPU 14 to perform the calculations relevant to degree of coincidence.

FIG. 21 shows an example of how device 20 might be configured in order to calculate a normalized correlation coefficient via Formula (1).

The sum $\Sigma I$ of image data $I_i$ is calculated by addition circuit 91. The square of this sum $(\Sigma I)^2$ is calculated by squaring circuit 99. The values $I_i^2$ are calculated by r number of squaring circuits 92, and the sums of these values $\Sigma I^2$ by addition circuit 93.

r number of squaring circuits 94 calculate the products $I_i M_i$ of the image data $I_i$ and the reference data $M_i$ which correspond to these image data. The sum $\Sigma IM$ of these products is calculated by addition circuit 95.

For the reference data $M_i$, too, just as with the image data $I_i$, the sum $\Sigma M$ of the reference data $M_i$ is calculated by addition circuit 96, and the square of this sum $(\Sigma M)^2$ is calculated by squaring circuit 103. The squares $M_i^2$ of all the reference data $M_1$ are calculated by r number of squaring circuits 97. The sum $\Sigma M^2$ of these values is calculated by addition circuit 98.

The product $(\Sigma I)(\Sigma M)$ of the sum $\Sigma I$ if the image data obtained from addition circuit 91 and the sum $\Sigma M$ of the reference pattern data obtained from addition circuit 96 is calculated by multiplication circuit 101. The data which represent the number of data r is transmitted from CPU 14, and the product $r(\Sigma IM)$ of this number r and the value $\Sigma IM$ obtained by addition circuit 95 is calculated by multiplication circuit 102. The difference between the outputs of multiplication circuits 102 and 101 is calculated by subtraction circuit 106, and the square of the result of this subtraction is calculated by squaring circuit 109. In this way the numerator in Formula (1) is obtained.

The product $r(\Sigma I^2)$ of the output $\Sigma I^2$ of addition circuit 93 and the number r is calculated by multiplication circuit 100. The output $(\Sigma I^2)$ of squaring circuit 99 is subtracted from this product by subtraction circuit 105. In the same way, the product $r(\Sigma M^2)$ of the output $\Sigma M^2$ of addition circuit 98 and the number r is calculated by multiplication circuit 104, and the output $(\Sigma M^2)$ of squaring circuit 103 is subtracted from this product by subtraction circuit 107. The results of subtraction circuits 105 and 107 are multiplied together by multiplication circuit 108 to find the denominator in Formula (1).

Division circuit 110 divides the output of squaring circuit 109 by the output of multiplication circuit 108 to obtain the value $R^2$ on the left side of Formula (1).

I claim:

1. An image processing device for detecting a target location in an object image of an object pattern that resembles a reference pattern, said device comprising:
   an imaging device which captures said object image and outputs object image data which represents said object image;
   a memory device which stores said object image data, said reference pattern, and a first search zone on said object image to define a maximum searching area for searching for said object pattern in said object image;
   a starting point searching means to determine a selected starting point from a plurality of predetermined representative pixel locations for detecting said target location of said object pattern in said first search zone by calculating a feature analysis value representing a degree of resemblance between said reference pattern and said object pattern in a representative scanning window defined by each of said plurality of predetermined representative pixel locations and determining said selected starting point to be the one of said plurality of predetermined representative pixel locations having the highest feature analysis value;
   a feature counting means which takes said selected starting point as a center point of a second searching zone, said second searching zone being smaller than said first searching zone, and calculates said feature analysis value representing a degree of resemblance between said reference pattern and said object pattern defined by each pixel location in said second searching zone; and
   a first control device to find a specific pixel location in said second searching zone where said object pattern has the highest feature analysis value, and to determine said specific pixel location to be said target location of said object pattern to be detected if said specific pixel location is at said selected starting point, and if not, to reset said second searching zone to a third searching zone whose center pixel is said specific pixel location having the highest feature analysis value, and repeat said calculating said feature analysis value of said object pattern defined by each pixel location in said third searching zone until said calculated feature analysis value for a pixel location in said third searching area is identical to a feature analysis value for an immediately preceding pixel location, and to determine said pixel location to be said target location of said object pattern to be detected.

2. An image processing device according to claim 1, further comprising a second control device to incrementally rotate said object image with respect to said reference pattern, while said feature counting means calculates said feature analysis, and said first control device finds said specific pixel location, thereby said second control device finding a target angle of said object image with respect to said reference pattern.

3. An image processing device according to claim 1, wherein said feature analysis value representing a degree of resemblance is a normalized correlation value representing a degree of coincidence between said reference pattern and said object pattern.

4. An image processing device according to claim 1, wherein, when there are a plurality of specific pixel locations which have the same highest feature value and one of said plurality of specific pixel locations is said selected starting point in said second searching zone, said first control device finds a sum of said feature analysis values of each object pattern defined by said plurality of specific pixel locations which have the same highest feature value, determines said specific location having the highest sum as a first summed specific pixel location, and said first control device defines said first summed specific pixel location as said target location of said object pattern if said first summed specific pixel location is the same as said selected starting point, or said first control device sets said first summed specific pixel location as said center point of said third searching zone if said first summed specific pixel location is not the same as said selected starting point.

5. An image processing device according to claim 4, wherein, when there are a plurality of specific pixel locations which have the same highest feature value in said second searching zone, said first control device selects one of said plurality of specific location as said first summed specific pixel location based upon a predetermined priority scheme.

6. An image processing device according to claim 1, wherein, when there are a plurality of specific pixel locations which have the same highest feature value and none of said plurality of specific pixel locations is said selected starting point in said second searching zone, said first control device finds a sum of said feature analysis values of each object pattern defined by said plurality of specific pixel locations which have the same highest feature value, and determines said specific location having the highest sum as a second summed specific pixel location, and said second summed specific pixel location set as a center pixel of said third searching zone.

7. An image processing device according to claim 6, wherein, when there are a plurality of specific pixel locations which have the same highest feature value in said second searching zone, said first control device selects one of said plurality of specific location as said first summed specific pixel location based upon a predetermined priority scheme.

8. An image processing device according to claim 2, wherein said second control device calculates said target angle of rotation at which said object image most nearly matches said reference pattern, based on, by means of parabolic approximation, said feature analysis values at said rotated second and third searching zones and each angle of said incremental rotation.

9. An image processing device according to claim 2, further comprising a fine searching means to detect said target location in an object image with a finer precision than one pixel size based on said highest feature analysis value and said specific pixel location found by said first or second control device, and feature analysis feature values at pixel locations surrounding said specific pixel location.

10. An image processing device according to claim 9, wherein said fine searching means detects said target location based on an apex location of a parabolic curve which is calculated by three points defined with pixel locations in vertical and horizontal directions and feature analysis values, said three points in horizontal direction is defined by said specific pixel location in horizontal direction and said highest feature analysis value, and horizontally neighboring two pixel locations and feature analysis values, said three points in vertical direction is defined by said specific pixel location in vertical direction and said highest feature analysis value, and vertically neighboring two pixel locations and feature analysis values.

11. An image processing device according to claim 9, wherein said fine searching means detects said target location by barycentric calculation.

* * * * *